(12) United States Patent
Follmer et al.

(10) Patent No.: US 8,818,618 B2
(45) Date of Patent: Aug. 26, 2014

(54) SYSTEM AND METHOD FOR PROVIDING A USER INTERFACE FOR VEHICLE MONITORING SYSTEM USERS AND INSURERS

(75) Inventors: Todd Follmer, Coto de Caza, CA (US); Scott McClellan, Heber City, UT (US); Eric Capps, Salt Lake City, UT (US); Richard Eyre, Salt Lake City, UT (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 1280 days.

(21) Appl. No.: 11/779,178

(22) Filed: Jul. 17, 2007

(65) Prior Publication Data
US 2009/0024273 A1 Jan. 22, 2009

(51) Int. Cl.
*G06Q 40/00* (2012.01)
*G06Q 10/10* (2012.01)
*G06Q 40/08* (2012.01)
*G08G 1/01* (2006.01)

(52) U.S. Cl.
CPC .............. *G08G 1/0137* (2013.01); *G06Q 10/10* (2013.01); *G06Q 40/08* (2013.01)
USPC ............................................ 701/33.4; 705/4

(58) Field of Classification Search
CPC ..... G06Q 40/08; G08G 1/0137; G08G 1/052; G08G 1/08
USPC ......... 701/35, 200, 214, 224, 32.3, 33.4, 400, 701/408, 409, 450, 451, 534; 340/990, 340/995.1, 995.25, 438, 905, 936; 707/104.1; 705/4
See application file for complete search history.

(56) References Cited

U.S. PATENT DOCUMENTS 3,975,708 A 8/1976 Lusk
4,369,427 A 1/1983 Drebinger et al.
(Continued)

FOREIGN PATENT DOCUMENTS

CA 2071931 12/1993
CA 2307259 10/2001
(Continued)

OTHER PUBLICATIONS

European Patent Office; Extended European Search Report for Application No. 08794503.6-1238 / 2191393; 7 pages, Apr. 26, 2012.
(Continued)

*Primary Examiner* — Thomas G Black
*Assistant Examiner* — Ce Li
(74) *Attorney, Agent, or Firm* — Workman Nydegger

(57) ABSTRACT

System and method for providing a website, portal and/or user interface adding, reviewing and editing street mapping data and speed-by-street information. The website, portal and/or user interface allows users to add, review and editing all or selected matters of safety data and street information in a street mapping database. The website, portal and/or user interface also allows the user to select any geographical area and/or any group of vehicles and adjust the system response for any reason, such as weather, traffic, road conditions, etc. The present invention also provides a website, portal and/or user interface that allows a user to register their vehicle and/or vehicle monitoring system hardware so that driver profile information and performance data may be stored on the site and viewed by insurance companies. The insurance companies may bid on drivers they wanted to insure.

33 Claims, 4 Drawing Sheets

(56) References Cited

U.S. PATENT DOCUMENTS

| | | | |
|---|---|---|---|
| 4,395,624 A | 7/1983 | Wartski | |
| 4,419,654 A | 12/1983 | Funk | |
| 4,458,535 A | 7/1984 | Juergens | |
| 4,591,823 A | 5/1986 | Horvat | |
| 4,785,280 A | 11/1988 | Fubini | |
| 4,843,578 A | 6/1989 | Wade | |
| 4,926,417 A | 5/1990 | Futami | |
| 4,939,652 A | 7/1990 | Steiner | |
| 5,032,821 A | 7/1991 | Domanico | |
| 5,074,144 A | 12/1991 | Krofchalk et al. | |
| 5,119,504 A | 6/1992 | Durboraw, III | |
| 5,223,844 A | 6/1993 | Mansell et al. | |
| 5,225,842 A | 7/1993 | Brown et al. | |
| 5,303,163 A | 4/1994 | Ebaugh et al. | 364/550 |
| 5,305,214 A | 4/1994 | Komatsu | |
| 5,309,139 A | 5/1994 | Austin | |
| 5,311,197 A | 5/1994 | Sorden et al. | |
| 5,325,082 A | 6/1994 | Rodriguez | |
| 5,347,260 A | 9/1994 | Ginzel | |
| 5,359,528 A | 10/1994 | Haendel | |
| 5,365,114 A | 11/1994 | Tsurushima | |
| 5,365,451 A | 11/1994 | Wang et al. | |
| 5,394,136 A | 2/1995 | Lammers | |
| 5,400,018 A | 3/1995 | Scholl | |
| 5,414,432 A | 5/1995 | Penny, Jr. et al. | |
| 5,422,624 A | 6/1995 | Smith | |
| 5,424,584 A | 6/1995 | Matsuda | |
| 5,430,432 A | 7/1995 | Camhi | |
| 5,436,612 A | 7/1995 | Aduddell | |
| 5,436,837 A | 7/1995 | Gerstung | |
| 5,446,659 A | 8/1995 | Yamawaki | |
| 5,453,939 A | 9/1995 | Hoffman | |
| 5,457,439 A | 10/1995 | Kuhn | |
| 5,475,597 A | 12/1995 | Buck | |
| 5,485,116 A | 1/1996 | Cserveny et al. | |
| 5,485,161 A | 1/1996 | Vaughn | |
| 5,499,182 A | 3/1996 | Ousborne | |
| 5,521,579 A | 5/1996 | Bernhard | |
| 5,521,580 A | 5/1996 | Kaneko | |
| 5,525,960 A | 6/1996 | McCall | |
| 5,546,305 A | 8/1996 | Kondo | |
| 5,548,273 A | 8/1996 | Nicol | |
| 5,570,087 A | 10/1996 | Lemelson | |
| 5,581,464 A | 12/1996 | Woll | |
| 5,586,130 A | 12/1996 | Doyle | |
| 5,600,558 A | 2/1997 | Mearek | |
| 5,612,875 A | 3/1997 | Haendel | |
| 5,617,086 A | 4/1997 | Klashinsky et al. | |
| 5,625,337 A | 4/1997 | Medawar | |
| 5,638,077 A | 6/1997 | Martin | |
| 5,642,284 A | 6/1997 | Parupalli | |
| 5,648,755 A | 7/1997 | Yagihashi | |
| 5,659,289 A | 8/1997 | Zonkoski | |
| 5,689,067 A | 11/1997 | Klein | |
| 5,708,417 A | 1/1998 | Tallman | |
| 5,717,374 A | 2/1998 | Smith | |
| 5,719,771 A | 2/1998 | Buck | |
| 5,723,768 A | 3/1998 | Ammon | |
| 5,731,285 A | 3/1998 | Pavone et al. | |
| 5,731,785 A | 3/1998 | Lemelson et al. | |
| 5,740,548 A | 4/1998 | Hudgens | |
| 5,742,915 A | 4/1998 | Stafford | |
| 5,751,245 A | 5/1998 | Janky et al. | |
| 5,764,139 A | 6/1998 | Nojima | |
| 5,767,767 A | 6/1998 | Lima | |
| 5,777,580 A | 7/1998 | Janky et al. | |
| 5,795,997 A | 8/1998 | Gittins | |
| 5,797,134 A | 8/1998 | McMillan et al. | |
| 5,801,618 A | 9/1998 | Jenkins | |
| 5,801,948 A | 9/1998 | Wood | |
| 5,815,071 A | 9/1998 | Doyle | |
| 5,819,090 A * | 10/1998 | Wolf et al. | 719/320 |
| 5,819,198 A | 10/1998 | Peretz | |
| 5,825,283 A | 10/1998 | Camhi | |
| 5,825,284 A | 10/1998 | Dunwoody | |
| 5,829,782 A | 11/1998 | Breed et al. | |
| 5,844,475 A | 12/1998 | Horie | |
| 5,847,271 A | 12/1998 | Poublon | |
| 5,862,500 A | 1/1999 | Goodwin | |
| 5,867,093 A | 2/1999 | Dodd | |
| 5,877,678 A | 3/1999 | Donoho | |
| 5,880,674 A | 3/1999 | Ufkes | |
| 5,880,958 A | 3/1999 | Helms et al. | |
| 5,883,594 A | 3/1999 | Lau | |
| 5,892,434 A | 4/1999 | Carlson | |
| 5,907,277 A | 5/1999 | Tokunaga | |
| 5,914,654 A | 6/1999 | Smith | |
| 5,918,180 A | 6/1999 | Dimino | |
| 5,926,087 A | 7/1999 | Busch | |
| 5,928,291 A | 7/1999 | Jenkins et al. | |
| 5,941,915 A | 8/1999 | Federle et al. | 701/1 |
| 5,945,919 A | 8/1999 | Trask | |
| 5,949,330 A | 9/1999 | Hoffman | |
| 5,949,331 A | 9/1999 | Schofield | |
| 5,952,941 A | 9/1999 | Mardirossian | |
| 5,954,781 A | 9/1999 | Slepian | |
| 5,955,942 A | 9/1999 | Slifkin | |
| 5,957,986 A | 9/1999 | Coverdill | |
| 5,964,816 A | 10/1999 | Kincaid | |
| 5,969,600 A | 10/1999 | Tanguay | |
| 5,974,356 A | 10/1999 | Doyle et al. | |
| 5,978,737 A | 11/1999 | Pawlowski | |
| 5,982,278 A | 11/1999 | Cuvelier | |
| 5,987,976 A | 11/1999 | Sarangapani | |
| 5,999,125 A | 12/1999 | Kurby | |
| 6,002,327 A | 12/1999 | Boesch | |
| 6,008,724 A | 12/1999 | Thompson | |
| 6,018,293 A | 1/2000 | Smith | |
| 6,026,292 A | 2/2000 | Coppinger et al. | |
| 6,028,508 A | 2/2000 | Mason | |
| 6,028,510 A | 2/2000 | Tamam | |
| 6,037,861 A | 3/2000 | Ying | |
| 6,037,862 A | 3/2000 | Ying | |
| 6,038,496 A | 3/2000 | Dobler | |
| 6,044,315 A | 3/2000 | Honeck | |
| 6,059,066 A | 5/2000 | Lary | |
| 6,060,989 A | 5/2000 | Gehlot | |
| 6,064,886 A | 5/2000 | Perez et al. | |
| 6,064,928 A | 5/2000 | Wilson | |
| 6,064,970 A | 5/2000 | McMillan et al. | |
| 6,067,008 A | 5/2000 | Smith | |
| 6,067,009 A | 5/2000 | Hozuka | |
| 6,072,388 A | 6/2000 | Kyrtsos | |
| 6,073,007 A | 6/2000 | Doyle | |
| 6,075,458 A | 6/2000 | Ladner et al. | |
| 6,078,853 A | 6/2000 | Ebner | |
| 6,081,188 A | 6/2000 | Kutlucinar | |
| 6,084,870 A | 7/2000 | Wooten et al. | |
| 6,094,149 A | 7/2000 | Wilson | |
| 6,098,048 A | 8/2000 | Dashefsky | |
| 6,100,792 A | 8/2000 | Ogino | |
| 6,104,282 A | 8/2000 | Fragoso | |
| 6,108,591 A | 8/2000 | Segal et al. | |
| 6,121,922 A | 9/2000 | Mohan | |
| 6,122,591 A | 9/2000 | Pomerantz | |
| 6,124,810 A | 9/2000 | Segal et al. | |
| 6,130,608 A | 10/2000 | McKeown | |
| 6,131,067 A | 10/2000 | Girerd et al. | |
| 6,133,827 A | 10/2000 | Alvey | |
| 6,141,610 A | 10/2000 | Rothert | |
| 6,147,598 A | 11/2000 | Murphy | |
| 6,161,072 A | 12/2000 | Clapper | |
| 6,172,602 B1 | 1/2001 | Hasfjord | |
| 6,178,374 B1 | 1/2001 | Möhlenkamp et al. | 701/117 |
| 6,184,784 B1 | 2/2001 | Shibuya | |
| 6,185,501 B1 | 2/2001 | Smith | |
| 6,198,995 B1 | 3/2001 | Settles | |
| 6,204,756 B1 | 3/2001 | Senyk | |
| 6,204,757 B1 | 3/2001 | Evans | |
| 6,208,240 B1 | 3/2001 | Ledesma | |
| 6,212,455 B1 | 4/2001 | Weaver | |
| 6,216,066 B1 | 4/2001 | Goebel | |
| 6,222,458 B1 | 4/2001 | Harris | |
| 6,225,898 B1 | 5/2001 | Kamiya | |

(56) References Cited

U.S. PATENT DOCUMENTS

| | | |
|---|---|---|
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,246,948 B1 | 6/2001 | Thakker |
| 6,247,360 B1 | 6/2001 | Anderson |
| 6,249,219 B1 | 6/2001 | Perez |
| 6,253,129 B1 | 6/2001 | Jenkins et al. |
| 6,253,151 B1 * | 6/2001 | Ohler et al. ............ 701/409 |
| 6,255,892 B1 | 7/2001 | Gartner |
| 6,255,939 B1 | 7/2001 | Roth |
| 6,262,658 B1 | 7/2001 | O'Connor |
| 6,265,989 B1 * | 7/2001 | Taylor ............ 340/901 |
| 6,266,588 B1 | 7/2001 | McClellan |
| 6,278,361 B1 | 8/2001 | Magiawala |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,306,063 B1 | 10/2001 | Horgan et al. ............ 477/108 |
| 6,308,120 B1 | 10/2001 | Good |
| 6,308,134 B1 | 10/2001 | Croyle et al. |
| 6,313,742 B1 | 11/2001 | Larson |
| 6,314,367 B1 * | 11/2001 | Ohler et al. ............ 701/484 |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Buchler |
| 6,339,739 B1 | 1/2002 | Folke |
| 6,339,745 B1 | 1/2002 | Novik ............ 701/208 |
| 6,343,301 B1 | 1/2002 | Halt et al. |
| 6,344,805 B1 | 2/2002 | Yasui |
| 6,351,211 B1 | 2/2002 | Bussard |
| 6,351,709 B2 | 2/2002 | King et al. |
| 6,356,188 B1 | 3/2002 | Meyers |
| 6,356,822 B1 | 3/2002 | Diaz |
| 6,356,833 B2 | 3/2002 | Jeon |
| 6,356,836 B1 | 3/2002 | Adolph ............ 701/208 |
| 6,359,554 B1 | 3/2002 | Skibinski |
| 6,362,730 B2 | 3/2002 | Razavi |
| 6,362,734 B1 | 3/2002 | McQuade |
| 6,366,199 B1 | 4/2002 | Osborn |
| 6,366,207 B1 | 4/2002 | Murphy |
| 6,378,959 B2 | 4/2002 | Lesesky |
| 6,385,533 B1 | 5/2002 | Halt et al. |
| 6,389,340 B1 | 5/2002 | Rayner |
| 6,393,348 B1 | 5/2002 | Ziegler |
| 6,401,029 B1 | 6/2002 | Kubota et al. |
| 6,404,329 B1 | 6/2002 | Hsu |
| 6,405,112 B1 | 6/2002 | Rayner |
| 6,405,128 B1 | 6/2002 | Bechtolsheim et al. ...... 701/208 |
| 6,415,226 B1 | 7/2002 | Kozak ............ 701/210 |
| 6,420,889 B1 | 7/2002 | Terada |
| 6,424,268 B1 | 7/2002 | Isonaga |
| 6,427,687 B1 | 8/2002 | Kirk |
| 6,430,488 B1 | 8/2002 | Goldman |
| 6,433,681 B1 | 8/2002 | Foo |
| 6,438,472 B1 | 8/2002 | Tano et al. |
| 6,441,732 B1 | 8/2002 | Laitsaari |
| 6,449,540 B1 | 9/2002 | Rayner |
| 6,459,365 B2 | 10/2002 | Tamura |
| 6,459,367 B1 | 10/2002 | Green |
| 6,459,369 B1 | 10/2002 | Wang |
| 6,459,961 B1 | 10/2002 | Obradovich |
| 6,459,969 B1 | 10/2002 | Bates |
| 6,462,675 B1 * | 10/2002 | Humphrey et al. ............ 340/905 |
| 6,472,979 B2 | 10/2002 | Schofield |
| 6,476,763 B2 | 11/2002 | Allen, Jr. |
| 6,480,106 B1 | 11/2002 | Crombez |
| 6,484,035 B2 | 11/2002 | Allen, Jr. |
| 6,484,091 B2 | 11/2002 | Shibata |
| 6,493,650 B1 | 12/2002 | Rodgers |
| 6,512,969 B1 | 1/2003 | Wang |
| 6,515,596 B2 * | 2/2003 | Awada ............ 340/905 |
| 6,519,512 B1 | 2/2003 | Haas |
| 6,525,672 B2 | 2/2003 | Chainer |
| 6,526,341 B1 | 2/2003 | Bird et al. |
| 6,529,159 B1 | 3/2003 | Fan et al. |
| 6,535,116 B1 | 3/2003 | Zhou |
| 6,542,074 B1 | 4/2003 | Tharman |
| 6,542,794 B2 | 4/2003 | Obradovich |
| 6,549,834 B2 | 4/2003 | McClellan et al. |
| 6,552,682 B1 | 4/2003 | Fan |
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,609,063 B1 | 8/2003 | Bender et al. ............ 701/209 |
| 6,609,064 B1 | 8/2003 | Dean ............ 701/213 |
| 6,611,740 B2 | 8/2003 | Lowrey |
| 6,611,755 B1 | 8/2003 | Coffee |
| 6,622,085 B1 | 9/2003 | Amita et al. ............ 701/208 |
| 6,629,029 B1 | 9/2003 | Giles |
| 6,630,884 B1 | 10/2003 | Shanmugham |
| 6,631,322 B1 | 10/2003 | Arthur et al. ............ 701/211 |
| 6,633,811 B1 | 10/2003 | Aumayer |
| 6,636,790 B1 | 10/2003 | Lightner |
| 6,639,512 B1 | 10/2003 | Lee |
| 6,643,578 B2 | 11/2003 | Levine |
| 6,651,001 B2 | 11/2003 | Apsell |
| 6,654,682 B2 | 11/2003 | Kane et al. |
| 6,657,540 B2 | 12/2003 | Knapp |
| 6,662,013 B2 | 12/2003 | Takiguchi et al. |
| 6,662,141 B2 | 12/2003 | Kaub ............ 702/181 |
| 6,664,922 B1 | 12/2003 | Fan |
| 6,665,613 B2 | 12/2003 | Duvall |
| 6,674,362 B2 | 1/2004 | Yoshioka |
| 6,675,085 B2 | 1/2004 | Straub |
| 6,677,854 B2 | 1/2004 | Dix |
| 6,678,612 B1 | 1/2004 | Khawam |
| 6,696,932 B2 | 2/2004 | Skibinski |
| 6,701,234 B1 | 3/2004 | Vogelsang |
| 6,703,925 B2 | 3/2004 | Steffel |
| 6,710,738 B2 | 3/2004 | Allen, Jr. |
| 6,714,894 B1 | 3/2004 | Tobey et al. ............ 702/188 |
| 6,718,235 B1 | 4/2004 | Borugian |
| 6,718,239 B2 | 4/2004 | Rayner |
| 6,718,258 B1 * | 4/2004 | Barton ............ 701/532 |
| 6,720,889 B2 * | 4/2004 | Yamaki et al. ............ 340/933 |
| 6,727,809 B1 | 4/2004 | Smith |
| 6,728,605 B2 * | 4/2004 | Lash et al. ............ 701/1 |
| 6,732,031 B1 | 5/2004 | Lowrey |
| 6,732,032 B1 | 5/2004 | Lowrey |
| 6,737,962 B2 | 5/2004 | Mayor |
| 6,741,169 B2 | 5/2004 | Magiawala |
| 6,741,170 B2 | 5/2004 | Alrabady |
| 6,745,153 B2 | 6/2004 | White |
| 6,748,322 B1 | 6/2004 | Fernandez |
| 6,750,761 B1 | 6/2004 | Newman |
| 6,750,762 B1 | 6/2004 | Porter |
| 6,756,916 B2 | 6/2004 | Yanai |
| 6,759,952 B2 | 7/2004 | Dunbridge |
| 6,766,244 B2 | 7/2004 | Obata et al. ............ 701/207 |
| 6,768,448 B2 | 7/2004 | Farmer |
| 6,775,602 B2 | 8/2004 | Gordon |
| 6,778,068 B2 | 8/2004 | Wolfe |
| 6,778,885 B2 | 8/2004 | Agashe et al. |
| 6,784,793 B2 | 8/2004 | Gagnon |
| 6,784,832 B2 | 8/2004 | Knockeart et al. |
| 6,788,196 B2 | 9/2004 | Ueda |
| 6,788,207 B2 | 9/2004 | Wilkerson |
| 6,792,339 B2 | 9/2004 | Basson |
| 6,795,017 B1 | 9/2004 | Puranik et al. |
| 6,798,354 B2 | 9/2004 | Schuessler |
| 6,803,854 B1 | 10/2004 | Adams et al. |

(56) References Cited

U.S. PATENT DOCUMENTS

| | | | |
|---|---|---|---|
| 6,807,481 B1 | 10/2004 | Gastelum | |
| 6,813,549 B2 | 11/2004 | Good | |
| 6,819,236 B2 | 11/2004 | Kawai | |
| 6,832,141 B2 | 12/2004 | Skeen et al. | |
| 6,845,314 B2 | 1/2005 | Fosseen | |
| 6,845,316 B2 | 1/2005 | Yates | 701/117 |
| 6,845,317 B2 * | 1/2005 | Craine | 701/454 |
| 6,847,871 B2 | 1/2005 | Malik et al. | 701/33 |
| 6,847,872 B2 | 1/2005 | Bodin | |
| 6,847,873 B1 | 1/2005 | Li | |
| 6,847,887 B1 | 1/2005 | Casino | 701/208 |
| 6,850,841 B1 | 2/2005 | Casino | 701/208 |
| 6,853,910 B1 | 2/2005 | Oesterling | |
| 6,859,039 B2 | 2/2005 | Horie | |
| 6,859,695 B2 | 2/2005 | Klausner | |
| 6,865,457 B1 | 3/2005 | Mittelsteadt | |
| 6,867,733 B2 | 3/2005 | Sandhu et al. | |
| 6,868,386 B1 | 3/2005 | Henderson et al. | |
| 6,870,469 B2 | 3/2005 | Ueda | |
| 6,873,253 B2 | 3/2005 | Veziris | |
| 6,873,261 B2 | 3/2005 | Anthony | |
| 6,873,998 B1 * | 3/2005 | Dorum et al. | 1/1 |
| 6,877,007 B1 * | 4/2005 | Hentzel et al. | 709/224 |
| 6,879,894 B1 | 4/2005 | Lightner | |
| 6,885,293 B2 | 4/2005 | Okumura | |
| 6,888,495 B2 | 5/2005 | Flick | |
| 6,892,131 B2 | 5/2005 | Coffee | |
| 6,894,606 B2 | 5/2005 | Forbes et al. | 340/435 |
| 6,895,332 B2 | 5/2005 | King | |
| 6,909,398 B2 | 6/2005 | Knockeart et al. | |
| 6,909,947 B2 | 6/2005 | Douros et al. | |
| 6,914,523 B2 | 7/2005 | Munch | |
| 6,922,133 B2 | 7/2005 | Wolfe | |
| 6,922,616 B2 | 7/2005 | Obradovich | |
| 6,922,622 B2 | 7/2005 | Dulin | |
| 6,925,425 B2 | 8/2005 | Remboski | |
| 6,928,348 B1 | 8/2005 | Lightner | |
| 6,931,309 B2 | 8/2005 | Phelan et al. | |
| 6,937,162 B2 | 8/2005 | Tokitsu | |
| 6,950,013 B2 | 9/2005 | Scaman | |
| 6,954,140 B2 | 10/2005 | Holler | |
| 6,958,976 B2 | 10/2005 | Kikkawa | |
| 6,960,168 B2 | 11/2005 | Yanagidaira et al. | |
| 6,965,827 B1 | 11/2005 | Wolfson | 701/207 |
| 6,968,311 B2 | 11/2005 | Knockeart et al. | |
| 6,970,075 B2 | 11/2005 | Cherouny | |
| 6,970,783 B2 | 11/2005 | Knockeart et al. | |
| 6,972,669 B2 | 12/2005 | Saito | |
| 6,980,131 B1 | 12/2005 | Taylor | |
| 6,981,565 B2 | 1/2006 | Gleacher | |
| 6,982,636 B1 | 1/2006 | Bennie | |
| 6,983,200 B2 | 1/2006 | Bodin | |
| 6,988,033 B1 | 1/2006 | Lowrey | |
| 6,988,034 B1 | 1/2006 | Marlatt et al. | 701/200 |
| 6,989,739 B2 | 1/2006 | Li | |
| 7,002,454 B1 | 2/2006 | Gustafson | |
| 7,002,579 B2 | 2/2006 | Olson | |
| 7,005,975 B2 | 2/2006 | Lehner | |
| 7,006,820 B1 | 2/2006 | Parker et al. | |
| 7,019,641 B1 | 3/2006 | Lakshmanan | |
| 7,023,321 B2 | 4/2006 | Brillon et al. | |
| 7,023,332 B2 | 4/2006 | Saito | |
| 7,024,318 B2 | 4/2006 | Fischer | |
| 7,027,808 B2 | 4/2006 | Wesby | |
| 7,034,705 B2 | 4/2006 | Yoshioka | |
| 7,038,578 B2 | 5/2006 | Will | |
| 7,042,347 B2 | 5/2006 | Cherouny | |
| 7,047,114 B1 | 5/2006 | Rogers | |
| 7,049,941 B2 | 5/2006 | Rivera-Cintron | |
| 7,054,742 B2 | 5/2006 | Khavakh et al. | 701/209 |
| 7,059,689 B2 | 6/2006 | Lesesky | |
| 7,069,126 B2 | 6/2006 | Bernard | |
| 7,069,134 B2 | 6/2006 | Williams | |
| 7,072,753 B2 | 7/2006 | Eberle | |
| 7,081,811 B2 | 7/2006 | Johnston | |
| 7,084,755 B1 | 8/2006 | Nord | |
| 7,088,225 B2 | 8/2006 | Yoshioka | |
| 7,089,116 B2 | 8/2006 | Smith | |
| 7,091,880 B2 | 8/2006 | Sorensen | |
| 7,098,812 B2 | 8/2006 | Hirota | |
| 7,099,750 B2 | 8/2006 | Miyazawa | |
| 7,099,774 B2 | 8/2006 | King | |
| 7,102,496 B1 | 9/2006 | Ernst | |
| 7,109,850 B2 | 9/2006 | Kawazoe et al. | |
| 7,109,853 B1 | 9/2006 | Mattson | |
| 7,113,081 B1 | 9/2006 | Reichow | |
| 7,113,107 B2 | 9/2006 | Taylor | |
| 7,117,075 B1 | 10/2006 | Larschan et al. | |
| 7,119,696 B2 | 10/2006 | Borugian | |
| 7,124,027 B1 | 10/2006 | Ernst | |
| 7,124,088 B2 | 10/2006 | Bauer et al. | |
| 7,129,825 B2 | 10/2006 | Weber | |
| 7,132,934 B2 | 11/2006 | Allison | |
| 7,132,937 B2 | 11/2006 | Lu | |
| 7,132,938 B2 | 11/2006 | Suzuki | |
| 7,133,755 B2 | 11/2006 | Salman | |
| 7,135,983 B2 | 11/2006 | Filippov | |
| 7,138,916 B2 | 11/2006 | Schwartz | |
| 7,139,661 B2 | 11/2006 | Holze | |
| 7,142,196 B1 * | 11/2006 | Connor et al. | 345/173 |
| 7,145,442 B1 | 12/2006 | Wai | |
| 7,149,206 B2 | 12/2006 | Pruzan | |
| 7,155,321 B2 | 12/2006 | Bromley et al. | 701/29 |
| 7,161,473 B2 | 1/2007 | Hoshal | |
| 7,164,986 B2 | 1/2007 | Humphries | |
| 7,170,390 B2 | 1/2007 | Quiñones | |
| 7,170,400 B2 | 1/2007 | Cowelchuk | |
| 7,174,243 B1 | 2/2007 | Lightner | |
| 7,176,813 B2 | 2/2007 | Kawamata et al. | |
| 7,180,407 B1 | 2/2007 | Guo | |
| 7,180,409 B2 | 2/2007 | Brey | |
| 7,183,942 B2 | 2/2007 | Rock et al. | |
| 7,187,271 B2 | 3/2007 | Nagata | |
| 7,188,025 B2 | 3/2007 | Hudson, Jr. | |
| 7,196,629 B2 | 3/2007 | Ruoss | |
| 7,197,500 B1 | 3/2007 | Israni et al. | 707/100 |
| 7,216,022 B2 | 5/2007 | Kynast et al. | 701/1 |
| 7,216,035 B2 | 5/2007 | Hörtner | |
| 7,218,211 B2 | 5/2007 | Ho | |
| 7,222,009 B2 | 5/2007 | Hijikata | |
| 7,225,065 B1 | 5/2007 | Hunt | |
| 7,228,211 B1 | 6/2007 | Lowrey | |
| 7,233,235 B2 | 6/2007 | Pavlish | |
| 7,236,862 B2 | 6/2007 | Kanno | |
| 7,239,948 B2 | 7/2007 | Nimmo | |
| 7,256,686 B2 | 8/2007 | Koutsky | |
| 7,256,700 B1 | 8/2007 | Ruocco | |
| 7,256,702 B2 | 8/2007 | Isaacs | |
| 7,260,497 B2 | 8/2007 | Watabe | |
| RE39,845 E | 9/2007 | Hasfjord | |
| 7,269,507 B2 | 9/2007 | Cayford | 701/208 |
| 7,269,530 B1 | 9/2007 | Lin | |
| 7,271,716 B2 | 9/2007 | Nou | |
| 7,273,172 B2 | 9/2007 | Olsen | |
| 7,280,046 B2 | 10/2007 | Berg | |
| 7,283,904 B2 | 10/2007 | Benjamin | |
| 7,286,917 B2 | 10/2007 | Hawkins | |
| 7,286,929 B2 | 10/2007 | Staton | |
| 7,289,024 B2 | 10/2007 | Sumcad | |
| 7,289,035 B2 | 10/2007 | Nathan | |
| 7,292,152 B2 | 11/2007 | Torkkola | |
| 7,292,159 B2 | 11/2007 | Culpepper | |
| 7,295,921 B2 | 11/2007 | Spencer et al. | |
| 7,298,248 B2 | 11/2007 | Finley | |
| 7,298,249 B2 | 11/2007 | Avery | |
| 7,301,445 B2 | 11/2007 | Moughler | |
| 7,317,383 B2 | 1/2008 | Ihara | |
| 7,317,392 B2 | 1/2008 | DuRocher | |
| 7,317,927 B2 | 1/2008 | Staton | |
| 7,319,848 B2 | 1/2008 | Obradovich | |
| 7,321,294 B2 | 1/2008 | Mizumaki | |
| 7,321,825 B2 | 1/2008 | Ranalli | |
| 7,323,972 B2 | 1/2008 | Nobusawa | |
| 7,323,974 B2 | 1/2008 | Schmid | |

(56) References Cited

U.S. PATENT DOCUMENTS

| | | |
|---|---|---|
| 7,323,982 B2 | 1/2008 | Staton |
| 7,327,239 B2 | 2/2008 | Gallant |
| 7,327,258 B2 | 2/2008 | Fast |
| 7,333,883 B2 | 2/2008 | Geborek |
| 7,339,460 B2 | 3/2008 | Lane |
| 7,349,782 B2 | 3/2008 | Churchill |
| 7,352,081 B2 | 4/2008 | Taurasi |
| 7,355,508 B2 | 4/2008 | Mian |
| 7,362,239 B2 | 4/2008 | Franczyk et al. |
| 7,365,639 B2 | 4/2008 | Yuhara |
| 7,366,551 B1 | 4/2008 | Hartley |
| 7,375,624 B2* | 5/2008 | Hines et al. ............... 340/438 |
| 7,376,499 B2 | 5/2008 | Salman |
| 7,378,946 B2 | 5/2008 | Lahr |
| 7,378,949 B2 | 5/2008 | Chen |
| 7,386,394 B2 | 6/2008 | Shulman |
| 7,398,153 B2 | 7/2008 | Workman et al. |
| 7,421,334 B2 | 9/2008 | Dahlgren et al. ............ 701/117 |
| 7,433,889 B1 | 10/2008 | Barton ....................... 707/104.1 |
| 7,447,509 B2 | 11/2008 | Cossins et al. ............... 455/457 |
| 7,499,949 B2 | 3/2009 | Barton ....................... 707/104.1 |
| 7,565,230 B2 | 7/2009 | Gardner et al. ................. 701/35 |
| 7,584,033 B2 | 9/2009 | Mittelsteadt et al. |
| 7,589,643 B2 | 9/2009 | Dagei et al. |
| 7,660,658 B2 | 2/2010 | Sheynblat |
| 7,671,727 B2 | 3/2010 | Flick |
| 7,671,752 B2* | 3/2010 | Sofer ............................ 340/576 |
| 7,739,036 B2 | 6/2010 | Grimm et al. |
| 7,783,406 B2 | 8/2010 | Rothschild |
| 7,821,421 B2 | 10/2010 | Tamir et al. |
| 7,859,392 B2* | 12/2010 | McClellan et al. .......... 340/441 |
| 7,880,642 B2 | 2/2011 | Gueziec ....................... 340/905 |
| 7,898,388 B2 | 3/2011 | Ehrman et al. ................. 340/5.8 |
| 7,941,258 B1 | 5/2011 | Mittelsteadt et al. .......... 701/35 |
| 8,188,887 B2 | 5/2012 | Catten et al. |
| 8,428,307 B2* | 4/2013 | Bradai et al. ................. 382/104 |
| 2001/0014849 A1* | 8/2001 | King et al. ................... 701/210 |
| 2001/0018628 A1 | 8/2001 | Jenkins et al. ................. 701/35 |
| 2001/0048364 A1 | 12/2001 | Kalthoff et al. |
| 2002/0019703 A1 | 2/2002 | Levine |
| 2002/0024444 A1 | 2/2002 | Hiyama et al. ............... 340/576 |
| 2002/0026334 A1 | 2/2002 | Igoe |
| 2002/0029226 A1* | 3/2002 | Li et al. ....................... 707/104.1 |
| 2002/0111725 A1 | 8/2002 | Burge ............................ 701/29 |
| 2002/0111844 A1 | 8/2002 | Vanstory et al. |
| 2002/0116228 A1 | 8/2002 | Bauer et al. |
| 2002/0120371 A1 | 8/2002 | Leivian et al. |
| 2002/0126023 A1 | 9/2002 | Awada |
| 2003/0016636 A1 | 1/2003 | Tari et al. |
| 2003/0055555 A1 | 3/2003 | Knockeart et al. |
| 2003/0060950 A1 | 3/2003 | McKeown et al. |
| 2003/0169185 A1 | 9/2003 | Taylor |
| 2004/0039504 A1 | 2/2004 | Coffee et al. |
| 2004/0039609 A1 | 2/2004 | Burkitt |
| 2004/0054687 A1* | 3/2004 | McDonough ............... 707/104.1 |
| 2004/0066330 A1 | 4/2004 | Knockeart et al. |
| 2004/0077339 A1 | 4/2004 | Martens |
| 2004/0083041 A1 | 4/2004 | Skeen et al. |
| 2004/0107037 A1 | 6/2004 | Straub |
| 2004/0107220 A1* | 6/2004 | Natesan et al. ............. 707/104.1 |
| 2004/0139034 A1 | 7/2004 | Farmer |
| 2004/0142672 A1 | 7/2004 | Stankewitz |
| 2004/0153362 A1 | 8/2004 | Bauer et al. |
| 2004/0172418 A1* | 9/2004 | Dorum et al. ............... 707/104.1 |
| 2004/0186661 A1* | 9/2004 | Barton ......................... 701/200 |
| 2004/0210353 A1 | 10/2004 | Rice ................................ 701/1 |
| 2004/0236474 A1 | 11/2004 | Chowdhary et al. ............. 701/1 |
| 2004/0236475 A1 | 11/2004 | Chowdhary |
| 2004/0254698 A1* | 12/2004 | Hubbard et al. ................ 701/35 |
| 2004/0257245 A1* | 12/2004 | Jo ................................. 340/936 |
| 2004/0260579 A1 | 12/2004 | Tremiti |
| 2005/0021270 A1 | 1/2005 | Hong et al. |
| 2005/0049765 A1 | 3/2005 | Chetia et al. |
| 2005/0064835 A1 | 3/2005 | Gusler |
| 2005/0065711 A1 | 3/2005 | Dahlgren et al. ............ 701/117 |
| 2005/0091018 A1 | 4/2005 | Craft |
| 2005/0091175 A9 | 4/2005 | Farmer |
| 2005/0096809 A1 | 5/2005 | Skeen et al. |
| 2005/0102098 A1* | 5/2005 | Montealegre et al. ........ 701/209 |
| 2005/0107944 A1 | 5/2005 | Hovestadt et al. |
| 2005/0131597 A1 | 6/2005 | Raz et al. |
| 2005/0137757 A1 | 6/2005 | Phelan et al. |
| 2005/0143903 A1 | 6/2005 | Park et al. |
| 2005/0171663 A1 | 8/2005 | Mittelsteadt et al. |
| 2006/0022842 A1 | 2/2006 | Zoladek et al. |
| 2006/0053038 A1 | 3/2006 | Warren et al. |
| 2006/0055565 A1* | 3/2006 | Kawamata et al. ...... 340/995.13 |
| 2006/0154687 A1 | 7/2006 | McDowell |
| 2006/0224306 A1 | 10/2006 | Workman et al. |
| 2006/0234711 A1 | 10/2006 | McArdle |
| 2006/0253307 A1 | 11/2006 | Warren et al. |
| 2007/0005404 A1 | 1/2007 | Raz et al. |
| 2007/0005609 A1 | 1/2007 | Breed |
| 2007/0027583 A1 | 2/2007 | Tamir et al. |
| 2007/0027726 A1 | 2/2007 | Warren et al. |
| 2007/0050130 A1* | 3/2007 | Grimm et al. ................ 701/208 |
| 2007/0057781 A1 | 3/2007 | Breed |
| 2007/0061155 A1 | 3/2007 | Ji et al. |
| 2007/0126601 A1 | 6/2007 | Park |
| 2007/0139189 A1 | 6/2007 | Helmig |
| 2007/0229234 A1 | 10/2007 | Smith |
| 2007/0236342 A1* | 10/2007 | Hines et al. .................. 340/438 |
| 2007/0260363 A1 | 11/2007 | Miller |
| 2007/0293206 A1 | 12/2007 | Lund |
| 2008/0027642 A1* | 1/2008 | Winberry et al. ............. 701/212 |
| 2008/0046274 A1* | 2/2008 | Geelen et al. ..................... 705/1 |
| 2008/0059055 A1* | 3/2008 | Geelen et al. ................. 701/201 |
| 2008/0064413 A1 | 3/2008 | Breed |
| 2008/0065325 A1* | 3/2008 | Geelen et al. ................. 701/210 |
| 2008/0082221 A1 | 4/2008 | Nagy |
| 2008/0082225 A1* | 4/2008 | Barrett ............................ 701/26 |
| 2008/0086508 A1 | 4/2008 | Ballew |
| 2008/0120175 A1 | 5/2008 | Doering |
| 2008/0177469 A1* | 7/2008 | Geelen et al. ................. 701/209 |
| 2008/0221787 A1* | 9/2008 | Vavrus ......................... 701/201 |
| 2008/0243558 A1 | 10/2008 | Gupte |
| 2008/0252487 A1* | 10/2008 | McClellan et al. ........... 340/936 |
| 2008/0255888 A1 | 10/2008 | Berkobin |
| 2008/0319602 A1 | 12/2008 | McClellan et al. |
| 2009/0079555 A1 | 3/2009 | Aguirre De Carcer et al. |
| 2010/0030459 A1* | 2/2010 | Geelen et al. ................. 701/200 |
| 2010/0030586 A1 | 2/2010 | Taylor et al. |
| 2010/0131186 A1* | 5/2010 | Geelen et al. ................. 701/200 |
| 2010/0131189 A1* | 5/2010 | Geelen et al. ................. 701/201 |
| 2010/0131304 A1 | 5/2010 | Collopy et al. |
| 2010/0205012 A1 | 8/2010 | McClellan |
| 2010/0207751 A1 | 8/2010 | Follmer et al. |
| 2010/0207787 A1 | 8/2010 | Catten et al. |

FOREIGN PATENT DOCUMENTS

| | | | |
|---|---|---|---|
| DE | 197 00 353 A1 | 7/1998 | ............ B60K 28/00 |
| EP | 0843177 | 5/1998 | |
| EP | 0921509 | 6/1999 | |
| EP | 1811481 | 7/2007 | |
| GB | 2434346 | 7/2007 | |
| JP | 2004326492 | 11/2004 | |
| JP | 2005-223791 | 8/2005 | |
| JP | 2005-250825 | 9/2005 | |
| JP | 2007235530 | 9/2007 | |
| WO | WO 2005003885 | 1/2005 | |
| WO | WO 2005019273 | 11/2005 | |
| WO | WO2005109369 | 11/2005 | |
| WO | WO2008109477 | 9/2008 | |

OTHER PUBLICATIONS

Ogle, et al.; *Accuracy of Global Positioning System for Determining Driver Performance Parameters*; Transportation Research Record 1818; Paper No. 02-1063; pp. 12-24.

Shen, et al.; *A computer Assistant for Vehicle Dispatching with Learning Capabilities*; Annals of Operations Research 61; pp. 189-211, 1995.

(56) References Cited

OTHER PUBLICATIONS

Tijerina, et al.; *Final Report Supplement; Heavy Vehicle Driver Workload Assessment; Task 5: Workload Assessment Protocol*; U.S. Department of Transportation; 69 pages, Oct. 1996.
Myra Blanco; *Effects of In-Vehicle Information System (IVIS) Tasks on the Information Processing Demands of a Commercial Vehicle Operat ons (CVO) Driver*; 230 pages, 1999.
EPO, Communication pursuant to Article 94(3) EPC, Application No. 08 794 503.6-1238, Ref. P039551EP CLM, 7 pages, Jan. 28, 2013.
U.S. Appl. No. 11/805,238, Jul. 30, 2009, Office Action.
U.S. Appl. No. 11/755,556, Sep. 1, 2009, Office Action.
U.S. Appl. No. 11/779,176, Mar. 17, 2010, Office Action.
U.S. Appl. No. 11/805,238, Apr. 26, 2010, Notice of Allowance.
U.S. Appl. No. 11/755,556, May 4, 2010, Office Action.
U.S. Appl. No. 11/758,444, Jul. 20, 2010, Office Action.
U.S. Appl. No. 11/768,056, Jan. 18, 2011, Office Action.
U.S. Appl. No. 12/379,083, Apr. 8, 2011, Office Action.
U.S. Appl. No. 12/379,153, Jul. 2011, Office Action.
U.S. Appl. No. 12/379,154, Aug. 1, 2011, Office Action.
U.S. Appl. No. 11/779,176, Aug. 18, 2011, Office Action.
U.S. Appl. No. 11/768,056, Sep. 16, 2011, Office Action.
U.S. Appl. No. 12/379,083, Nov. 23, 2011, Office Action.
U.S. Appl. No. 12/379,153, Dec. 16, 2011, Office Action.
U.S. Appl. No. 12/379,154, Jan. 30, 2012, Notice of Allowance.
U.S. Appl. No. 12/379,083, Feb. 2, 2012, Office Action.
U.S. Appl. No. 11/768,056, Feb. 16, 2012, Office Action.
U.S. Appl. No. 11/768,056, Jul. 19, 2012, Office Action.
U.S. Appl. No. 12/379,153, Jul. 31, 2012, Notice of Allowance.
U.S. Appl. No. 11/779,176, Dec. 3, 2012, Office Action.
U.S. Appl. No. 12/379,083, May 23, 2013, Office Action.
U.S. Appl. No. 11/768,056, Jun. 21, 2013, Office Action.
U.S. Appl. No. 11/779,176, Jul. 1, 2013, Notice of Allowance.
U.S. Appl. No. 12/379,153, Aug. 14, 2013, Notice of Allowance.
U.S. Appl. No. 12/975,489, Oct. 3, 2013, Office Action.
U.S. Appl. No. 12/379,083, Jan. 3, 2014, Office Action.
U.S. Appl. No. 11/768,056, Feb. 6, 2014, Office Action.
U.S. Appl. No. 11/758,444, Feb. 21, 2014, Office Action.
U.S. Appl. No. 11/755,556, Jun. 10, 2014, Office Action.
U.S. Appl. No. 11/758,444, Jun. 27, 2014, Office Action.

\* cited by examiner

SYSTEM AND METHOD FOR PROVIDING A USER INTERFACE FOR VEHICLE MONITORING SYSTEM USERS AND INSURERS

CROSS-REFERENCE TO RELATED APPLICATIONS

This application relates to the following co-pending and commonly assigned patent application: U.S. patent application Ser. No. 11/779,176, filed Jul. 17, 2007, entitled "System and Method for Categorizing Driving Behavior Using Driver Mentoring and/or Monitoring Equipment to Determine an Underwriting Risk," which application is hereby incorporated by reference herein in its entirety.

TECHNICAL FIELD

The present invention relates generally to a system and method for allowing users and insurers to enter, review and edit user data and street data into a vehicle monitoring system database.

BACKGROUND

A vehicle monitoring system or navigation system may use third party street mapping data that shows the location of streets and other landmarks. The mapping data may include speed-by-street data that identifies a posted speed limit for certain streets. Generally, there is no method for a user to submit corrections or modifications to the mapping data, such as incorrect posted speed limits, missing streets, or road hazards. As a result, a vehicle monitoring and/or mentoring system that uses the street mapping data may inaccurately evaluate a driver's performance or give incorrect mentoring or feedback information to a driver.

Currently, insurance rates are set for broad, generalized categories of drivers and vehicles, such as those discussed above, without the capability to set future insurance rates based upon the driving habits of an individual driver. U.S. Pat. Nos. 5,797,134 and 6,064,970, both entitled "Motor Vehicle Monitoring System for Determining a Cost of Insurance," and U.S. Pat. No. 6,868,386, entitled "Monitoring System for Determining and Communicating a Cost of Insurance," all assigned to Progressive Casualty Insurance Company (hereinafter "the Progressive Patents") and hereby incorporated by reference herein in their entirety, disclose a system and method in which previously set insurance rates are adjusted, after the coverage term, based upon driver behavior during the term of the insurance contract. The Progressive Patents disclose a passive vehicle monitoring system that observes driver behavior and vehicle operation, but that does not provide any mentoring, warnings or feedback to the driver. In particular, the system described in the Progressive Patents do not provide any mentoring, warnings or feedback based upon the driver's behavior or operation of the vehicle. There is no teaching, discussion or attempt by the Progressive patents to "improve" the driver's driving performance.

The Progressive Patents and other known systems do not provide a user interface, website or portal that allows insurers to bid on providing insurance coverage to groups of one or more drivers based upon known driver performance. Instead, known systems set driver insurance rates based upon a standard insurance rating profile. The known systems do not disclose a system or method for categorizing or grading driver skill or behavior for the purpose of setting future insurance rates or for grouping drivers for consideration by insurance companies. Current systems also lack the capability for real-time metered pricing, such as calculating an insurance price, rate or premium in real-time according to how a driver drives, where a vehicle is driven, when a vehicle is driven, and under what conditions a vehicle is driven (e.g. weather, road construction, or traffic conditions). The insurance rates disclosed in known systems are based upon a driver or insured profile that is established before monitoring the driver's performance.

SUMMARY OF THE INVENTION

In order to accurately monitor and/or mentor a driver and assess his or her driving performance, it is important that a vehicle monitoring system have an accurate database of posted speed limit data for the roads or streets on which a vehicle is operating. Some street mapping data base products have speed limit values for certain roads, but not all roads or segments of roads. If the database speed limit values differ from actual posted speed limits, then driver confidence in the vehicle monitoring and mentoring system may wane due to false alarms or cautions for speeding, for example. Accordingly, there exists a need in the industry for drivers and/or users of a driver monitoring and/or driver mentoring system to notify service providers of errors in posted and/or system speed limits.

These and other problems are generally solved or circumvented, and technical advantages are generally achieved, by preferred embodiments of the present invention in which a website, portal or user interface is provided to users for adding, reviewing, or editing street mapping data and speed-by-street information. More generally, the present application is directed to a system and method of providing a website, portal or user interface that allows a user to enter, review and edit all matters of safety data in a street mapping database, such as dangerous turns, hazardous roads, speed traps, bad intersections, rough roads, posted speeds, curvy roads, slippery when wet roads, the presence of schools, crosswalks, parks, playgrounds, the residence of handicapped children (e.g. deaf and/or blind individuals), and the like.

The present invention also allows a user to select any geographical area and/or any group of one or more vehicles and to adjust the system response for any reason, such as weather, traffic, road conditions, etc. For example, the user may we change speed limit thresholds, seatbelt use requirements, etc. in a selected zone due to weather and/or traffic conditions in that area.

The present invention further provides for several techniques, including the averaging and direction-weighted approaches discussed below, to address real-world, practical limitations and/or problems encountered when attempting to monitor speed by street data. In particular these techniques address the problems created by the intersection or proximity of two streets having different speed limits.

The present invention further provides several methods for reporting speed errors by the users in real-time from a vehicle, such as by a pin-pointing technique that allows the driver to mark a location by pressing a button on the vehicle monitoring system in the vehicle when the system incorrectly indicates a speeding violation.

The present invention further provides a website, portal and/or user interface that collects driver performance data from any vehicle that is equipped with a vehicle monitoring system. The driver or vehicle monitoring system user may use the site to register their vehicle and/or vehicle monitoring system hardware. The user may also enter driver information to be stored on the site. The driver information, such as driver profile and driving performance data, may be viewed by insurance companies using a website, portal and/or user interface. The insurance companies may then bid on drivers or groups of drivers that the companies may wanted to insure. The website, portal and/or user interface allows the raw driver profile and performance data to be collected and stored for the insurance companies to access and use that data to determine which drivers they want to insure and for what price.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
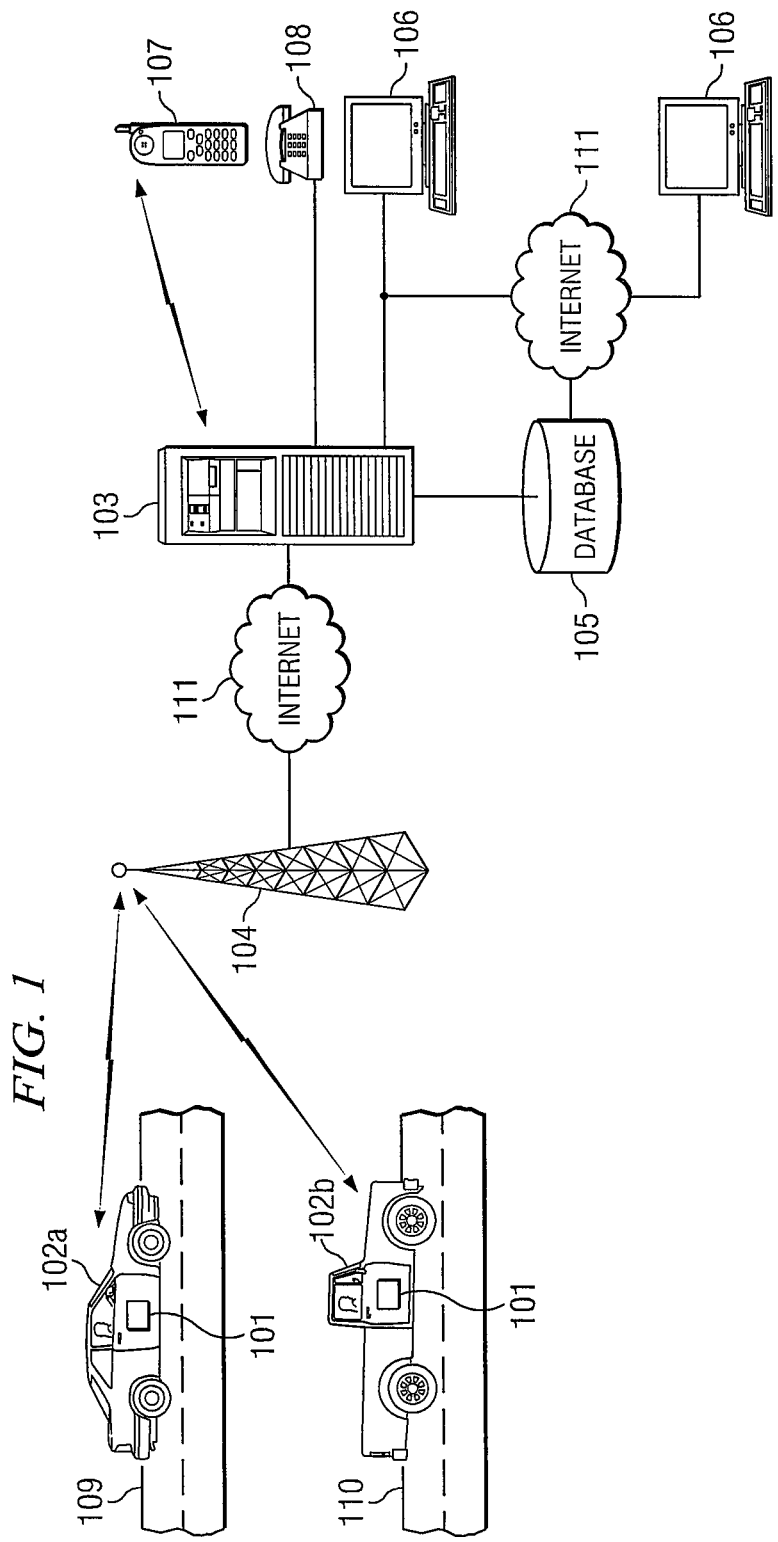
FIG. 1 illustrates one embodiment of a system for implementing the present invention.

The present invention provides many applicable inventive concepts that can be embodied in a wide variety of specific contexts. The specific embodiments discussed are merely illustrative of specific ways to make and use the invention, and do not limit the scope of the invention.

Driver performance may be measured using vehicle monitoring equipment that is installed in a vehicle and collects information, such as the vehicle's speed, acceleration, and location. The system may capture data identifying where the vehicle is driven, when the vehicle is driven, and how the vehicle is driven (i.e. driver performance). Such vehicle monitoring devices are described in U.S. patent application Ser. No. 11/805,237, filed on May 22, 2007, entitled "System and Method for Monitoring Vehicle Parameters and Driver Behavior," the disclosure of which is hereby incorporated by reference herein in its entirety. The vehicle monitoring system may receive inputs from internal and external sources and sensors such as accelerometers, global positioning systems (GPS), vehicle on-board diagnostic systems, seatbelt sensors, wireless device, or cell phone use detectors, alcohol vapor detectors, or trans-dermal ethanol detection. The vehicle monitoring system may be used to evaluate and grade driver behavior, as described in U.S. patent application Ser. No. 11/755,556, filed on May 30, 2007, entitled "System and Method for Evaluating Driver Behavior," the disclosure of which is hereby incorporated by reference herein in its entirety. The vehicle monitoring system may also be used to provide feedback and mentoring to the driver in order improve the driver's performance and driving behavior, such as described in U.S. patent application Ser. No. 11/768,056, filed on Jun. 25, 2007, entitled "System and Method for Monitoring and Improving Driver Behavior," the disclosure of which is hereby incorporated by reference herein in its entirety.

Using a vehicle monitoring and mentoring system, such as one of the devices described in the above-referenced patent applications, a driver's performance can be evaluated. The driver's performance may also be improved, if the driver follows mentoring feedback or warnings from the vehicle monitoring system. Driving performance may be evaluated as a letter grade (for example, A, B, C, D, or F), a number, a percentage, or using a more general category (for example, Excellent, Good, Fair, or Poor). The driver's performance may be evaluated against parameters, thresholds or criteria set in the vehicle monitoring system. Speed thresholds may be set to determine if the driver has exceeded a posted speed limit and/or a maximum selected speed. Multiple levels of speed thresholds may be set and, if any are exceeded, the vehicle monitoring system may also determine the extent and duration of each violation. For example, U.S. patent application Ser. No. 11/805,238, filed May 22, 2007, entitled "System and Method for Monitoring and Updating Speed-By-Street Data," the disclosure of which is hereby incorporated by reference herein in its entirety, discloses a system and method for detecting when a speed threshold has been exceeded. A speed-by-street database may be used to track the posted speeds for streets so that the current speed of vehicles on the streets may be evaluated for speeding conditions. Other features and conditions of the streets may also be tracked in a database, such as delays due to construction, weather or lane closures, speed traps, traffic signal outages, and actual or average observed speeds.

Acceleration thresholds may be set in the vehicle monitoring system to determine if the driver starts, stops or turns too aggressively. Multiple levels of acceleration thresholds may be established as described above for speed thresholds. Other parameters, thresholds and criteria may be established to monitor and evaluate other driver and vehicle operating conditions. For example, thresholds may also be set in other sensors such as seatbelt, wireless device, and alcohol vapor detectors to further evaluate the driver's behavior. The vehicle monitoring system may record the extent and duration to which any threshold is violated and uses that information to evaluate the driver.

The driver's behavior and driving performance may be improved by providing mentoring feedback when a particular threshold is violated. Thresholds are set, as described above, for numerous vehicle operating parameters, such as speed, acceleration, and the like. Upon detection that one of these thresholds has been exceeded, such as driving faster than a posted speed limit, the vehicle monitoring system may provide audible and/or visual feedback cues to mentor the driver. For example, an audible warning tone or voice message may indicate that a speed limit has been exceeded. Similarly, a warning light, icon, graphic or text message may be displayed to the driver to indicate that the speed limit has been exceeded. If the driver does not correct the speeding condition or other threshold violation, then a notice may be sent to a central monitoring server, parent, fleet manager or other supervisor or authority. On the other hand, if the driver chooses to follow the mentoring cues and reduces the vehicle's speed to or below the posted speed limit within an acceptable time, then the monitoring system may take into account the degree to which the driver reacted to the mentoring cues.

FIG. 1 illustrates one embodiment of a system for implementing the present invention. Vehicle monitoring and/or mentoring equipment 101 is installed in a plurality of vehicles 102. Monitoring devices 101 may be self contained, such as a single unit mounted on a windshield or dashboard of vehicle 102. Alternatively, the monitoring device may include multiple components, such as a processor or central unit mounted under a car seat or in a trunk of the vehicle and a user interface mounted on a dashboard or windshield. Similarly, monitoring device 101 may have a self-contained antenna in the unit or may be connected to remotely mounted antennas for communication with remote systems.

Vehicle monitoring units 101 may be connected to an on-board diagnostic (OBD) system or data bus in the vehicle. Information and data associated with the operation of the vehicle may be collected from the OBD system, such as engine operating parameters, vehicle identification, seatbelt use, door position, etc. The OBD system may also be used to power the vehicle monitoring device. Vehicle monitoring system 101 may receive inputs from internal and external sources and sensors such as accelerometers, global positioning systems (GPS), vehicle on-board diagnostic systems, seatbelt sensors, wireless device, or cell phone use detectors, alcohol vapor detectors, or trans-dermal ethanol detection. In one embodiment, the vehicle monitoring device is one of the types described in U.S. patent application Ser. No. 11/755,556, filed on May 30, 2007, entitled "System and Method for Evaluating Driver Behavior," the disclosure of which is hereby incorporated by reference herein in its entirety.

Information may be exchanged between vehicle monitoring system 101 and central monitoring system or server 103 in real-time or at intervals. For example, the vehicle operation parameters may be transmitted to server 103 via communication network 104, which may be a cellular, satellite, WiFi, Bluetooth, infrared, ultrasound, short wave, microwave or any other suitable network. Communication network 104 may be coupled to server 103 via Internet 111 or any other public or private network. Server 103 may process the parameters and/or store the data to database 105, which may be part of server 103 or a separate device located nearby or at a remote location. Users may access the data on server 103 and database 105 using terminals 106, which may be co-located with server 103 and database 105 or remotely coupled via the Internet or other network connection 111. In other embodiments, users may access the data on server 103, such as driver performance data, grades, street data, insurance data or other information, using telephones 107 and 108. For example, a user may call a customer service agent, who in turn accesses the data on server 103 for the user, or the user may access data via an interactive voice response (IVR) system.

In some embodiments, the data captured by monitoring system 101 in vehicle 102 may be transmitted via a hardwired communication connection, such as an Ethernet connection that is attached to vehicle 102 when the vehicle is within a service yard or at a base station or near server 103. Alternatively, the data may be transferred via a flash memory, diskette, or other memory device that can be directly connected to server 103 or terminal 106. Data, such as driving performance or warning thresholds, may also be uploaded from central server 103 to vehicle monitoring device 101 in a similar manner.

In one embodiment of the invention, the data captured by vehicle monitoring system 101 is used to monitor, mentor, grade, or otherwise analyze a driver's behavior during certain events. For example, if vehicle 102 is operated improperly, such as speeding, taking turns too fast, colliding with another vehicle, or driving in an unapproved area, then monitoring unit 101 or server 103 may assign a lower grade to the driver's performance. Additionally, if the driver's behavior is inappropriate or illegal, such as not wearing a seatbelt or using a cell phone while driving, the driver's performance evaluation may also be lowered even if this activity does not coincide with improper operation of the vehicle.

The vehicle monitoring system may have the capability of disabling the vehicle under certain conditions. For example, U.S. patent Ser. application No. 11/756,315, entitled "System and Method for Remotely Deactivating a Vehicle," and filed on May 31, 2007, the disclosure of which is hereby incorporated by reference herein in its entirety, discloses a vehicle monitoring system that is adapted to disable or deactivate a vehicle under preset conditions or upon command from an authority or supervisor. In another embodiment of the invention, the preset conditions or command from an authority or supervisor may be associated with an insurance status of the driver. For example, if an insurance company, supervisor, or other authority determines that the driver is uninsured, underinsured, lacking coverage required in a particular jurisdiction, or that the driver's insurance premiums are delinquent, then the vehicle monitoring system may be directed to disable or deactivate the vehicle. Alternatively, the vehicle monitoring system may provide warnings or other mentoring cues to the driver if it is determined that the driver is uninsured, underinsured, lacking coverage required in a particular jurisdiction, or that the driver's insurance premiums are delinquent. This alternative would allow the driver to continue to operate the vehicle, but would put the driver on notice that he or she is driving at their own risk.

Driving performance evaluation and grading may be performed by monitoring device 101 and/or by central server 103. The driver's behavior is typically evaluated against predetermined vehicle operation parameters, thresholds or other criteria. The driver's performance may monitored while driving vehicle 102 with monitoring device 101 installed for some period, such as a number of weeks or months, or for some number of miles driven or for some number of trips, for example. After monitoring device 101 has sufficient exposure to the driver's performance, the driver is assigned a driving grade or category. This grade or category may be assigned by monitoring device 101, or performance data from monitoring device 101 may be provided to central server 103, which may also assign a grade or category to the driver. Each driver's grade, category or other classification may be stored to database 105. Other driver information may also be stored in database 105, such as driver profile data, insurance policy data, contact information, license information and the like.

Driver performance is evaluated against parameters such as speed-by-street data to determine, based upon those parameters, if the driver is speeding and should receive mentoring feedback (i.e. a speeding warning) and/or be subject to a higher or lower grade. Therefore, it is important for the data, such as speed limits in a speed-by-street database, to be as accurate as possible. If the speed-by-street data is incorrect due to changes in posted speed limits, then drivers may be incorrectly warned or penalized for speeding or not warned/penalized due to the speed limit changes. Additionally, street conditions may change, for example, due to construction, increased or decreased traffic, accidents, or other factors. In one embodiment, the present invention provides users with the capability to update speed-by-street data, road conditions and other information so that the most current parameters are used to evaluate drivers.

In one embodiment of the invention, a website is provided to allow users to edit speed-by-street data and other road information. More generally, the invention allows users to access a website or other user interface that is capable of housing and editing all types of safety data, such as dangerous turns, hazardous roads, speed traps, bad intersections, rough roads, posted speeds, curvy roads, slippery when wet conditions, and the like. The present invention allows the user to select any geographical area and/or any group of vehicles and adjust the vehicle monitoring system response for any reason, such as weather and traffic conditions, so that the vehicle monitoring system uses the most appropriate parameters to evaluate driver performance. For example, the vehicle monitoring system may change speed or acceleration parameters, seatbelt use requirements, etc. in a particular zone or on certain streets due to weather and/or traffic conditions.

In embodiments of the present invention, a database of street data, such as speed-by-street data, is generated using publicly available information, such as posted speed limits. This information may be collected, for example, from publications or by actually driving the streets and recording the posted speed limits or observed road conditions. It is likely that errors will be present in the speed-by-street database due to incorrectly entered data and changes in the posted speeds. The present invention provides a method for identifying and correcting errors in the speed-by-street database.

For example, the speed-by-street database may incorrectly list the speed limit for street 109 as being 45 MPH, when the actual speed limit is 55 MPH. The data in the speed-by-street database may have been entered incorrectly, or the assigned speed limit for street 109 may have changed after the database was created. When vehicle 102a travels at the posted speed limit of 55 MPH on street 109, monitoring system 101 will identify a false speeding condition in which the posted speed is violated by 10 MPH. Depending upon the speeding threshold(s) that are set in monitoring system 101, one or more warnings or other notifications may be sent or recorded for this false speeding violation. As a result of the speed-by-street database error, the driver of vehicle 102a may receive unnecessary counseling or may receive a lower than deserved grade or evaluation of his driving habits.

Users can identify errors or potential errors in the speed-by-street database after a trip or drive by entering corrected or updated information via terminal 106 or telephones 107 or 108. In an alternative embodiment, the driver may identify errors or potential errors while driving using the vehicle monitoring system itself, such as by depressing a button on the vehicle monitoring system itself. This would identify to the vehicle monitoring system 101, server 103, and/or database 105 that there is a problem with the database speed limit value versus an actual posted speed limit value at that specific location. The vehicle monitoring system may send the GPS location of the error thereby identifying the street where the error exists. The vehicle monitoring system may also send the vehicle's current speed as an indicator of the actual posted speed. Sever 103 may store the corrected or updated information to database 105. The actual record for street 109 may be updated after one driver enters new information. Alternatively, the system may collect a number of user reports or updates over a period of time. After a sufficient number of reports or corrections are entered for a particular street, the vehicle monitoring system may correct the entry for that street. When the number of reported errors reaches a predetermined number, server 103 may update the speed-by-street database or may identify the location for further analysis of potential errors. For example, because the posted speed limit for street 109 is 55 MPH and the database speed limit is 45 MPH, monitoring system 101 will generate a speeding violation record every time vehicle 102a traverses street 109 at the posted speed limit or even below the posted speed limit. Eventually, when enough users report those false violations, the monitoring system may identify street 109 as an area of potential error in the speed-by-street database. Alternatively, users may be able to access the speed-by-street data directly via terminal 106 to review the current data associated with that street and to post a corrected speed value as needed.

Areas of potential error may be identified more quickly when server 103 receives database corrections or error notifications from numerous users. Server 103 may identify an area in which multiple users are reporting speed limit errors. The number of user-reported errors and the time period in which they are reported may affect how quickly database entries are corrected or reviewed. For example, if many users report errors in a short period of time for a particular street, then the database entry for that street may be prioritized for review or the database entry may be updated based upon the user's reports. If all users are reporting the same error, such as street 109 being mislabeled as 45 MPH instead of 55 MPH, then the system may update the database automatically. This type of correction would be useful for simple data-entry errors in which the wrong posted speed, street name, or other objective information is entered incorrectly. On the other hand, if the user reports are not consistent, then the database entry may be flagged for review instead of being automatically corrected. This situation may occur, for example, when actual street conditions differ from posted data, such as construction delays, lane closures, or weather issues, and different users report different problems for that street. Additionally, false errors may be reported unintentionally or intentionally and the reported actual speed limit values may vary in different reports. Under these circumstances automatic correction may take longer or a report may be created so that an agent from the service provider can inspect the posted street speed to verify the actual posted speed.

Once server 103 identifies a location of a speed-by-street or street conditions database error, server 103 may issue a report or alert to an operator regarding the potential error. The operator can then evaluate the location, such as street 109, by having someone go to the location and observe the posted speed limits. If the posted speed limits do not match the speed-by-street database, then the database can be updated with the correct information. An update message may be sent to in-vehicle monitoring systems 101 to provide corrections to each systems' copy of the speed-by-street database. Alternatively, when the monitoring systems undergo routine updates, maintenance or repair, the speed-by-street database may be updated, replaced or corrected with the actual speed limit value for street 109. In the alternative, the speed-by-street data may reside on a general server where it is updated continuously and accessed real-time by the vehicle/monitoring/mentoring system as the vehicle is driven.

In another alternative, if the speed-by-street database itself cannot be updated, a list of database errors can be maintained. This list of database errors may be stored at database 105 and/or sent to in-vehicle monitoring systems 101. Upon identifying a speeding violation, monitoring system 101 would then refer to the list of database errors to determine if the database speed limit for location of the speeding violation was correct. If the list of database errors did not include the current speeding location, then the monitoring system would operate normally. However, if the current speeding location was in the list of database errors, then the monitoring system may need to reevaluate the speeding condition. For example, the list of database errors may include a correct posted speed limit that the monitoring system could use in place of the database value. Alternatively or additionally, the list of database errors may include a list of alternative thresholds for the monitoring system 101 to use in that location. The alternative thresholds would be adjusted relevant to the original threshold by the amount of the speed limit error, thereby preventing the reporting of misidentified speeding violations.

Similarly, server 103 may refer to a list of database errors upon receiving a speeding violation notification to ensure that the violation was correctly identified. Alternatively, sever 103 may compare the reported vehicle speed to an updated speed-by-street database to ensure that the speeding violation notification was proper. Server 103 may not record or report speeding notifications that were improperly identified due to errors in the speed-by-street data.

In other embodiments, users may report streets for which the posted speeds in speed-by-street database were different from actual driving conditions. For example, street 110 may be a highway with a posted speed limit of 55 MPH that is accurately recorded in the speed-by-street database. However, normal traffic on highway 110 may travel at 65 MPH. Accordingly, vehicle 102b would be likely to follow the traffic flow, which would cause monitoring system 101 to generate a speeding violation. The speeding violation may be recorded locally, broadcast to the driver, and/or sent as a speeding notification to server 103. The driver is likely to ignore the speeding warning, if complying with the warning would cause him to fall behind traffic or be passed by many other vehicles. As a result, street 110 may be the source of multiple repeated speeding violations even if drivers are just keeping up with traffic. Users may enter actual traffic speeds into the speed-by-street database, which the vehicle monitoring system may then use to set driver performance thresholds instead of posted speed limits. Upon receiving reports of higher actual speeds on street 110, server 103 may report the location to an operator, who may then have the location visually inspected. The inspection of street 110 would show that the speed-by-street database is correct; however, the operator may then decide to create an exception for street 110 in order to minimize the number of speeding violation reports for that location.

Instead of modifying the speed-by-street database with an observed normal traffic speed, street 110 may be listed as an exception. The exception list could be maintained by server 103 and/or monitoring system 101. When monitoring system 101 determines that vehicle 102b has exceeded the speed-by-street database speed limit, monitor 101 may determine if location 110 in on an exception list. The exception list may include a modified speed limit and/or modified speeding thresholds to be used in that location. Similarly, when server 103 receives a speeding violation notification, it may refer to an exception list to determine if the location of the speeding violation is to be treated as an exception. If the location is on the exception list, then speeding reports that show a vehicle to be traveling at or below an observed "normal" traffic speed would not be treated as speeding violations.

Figure 2:
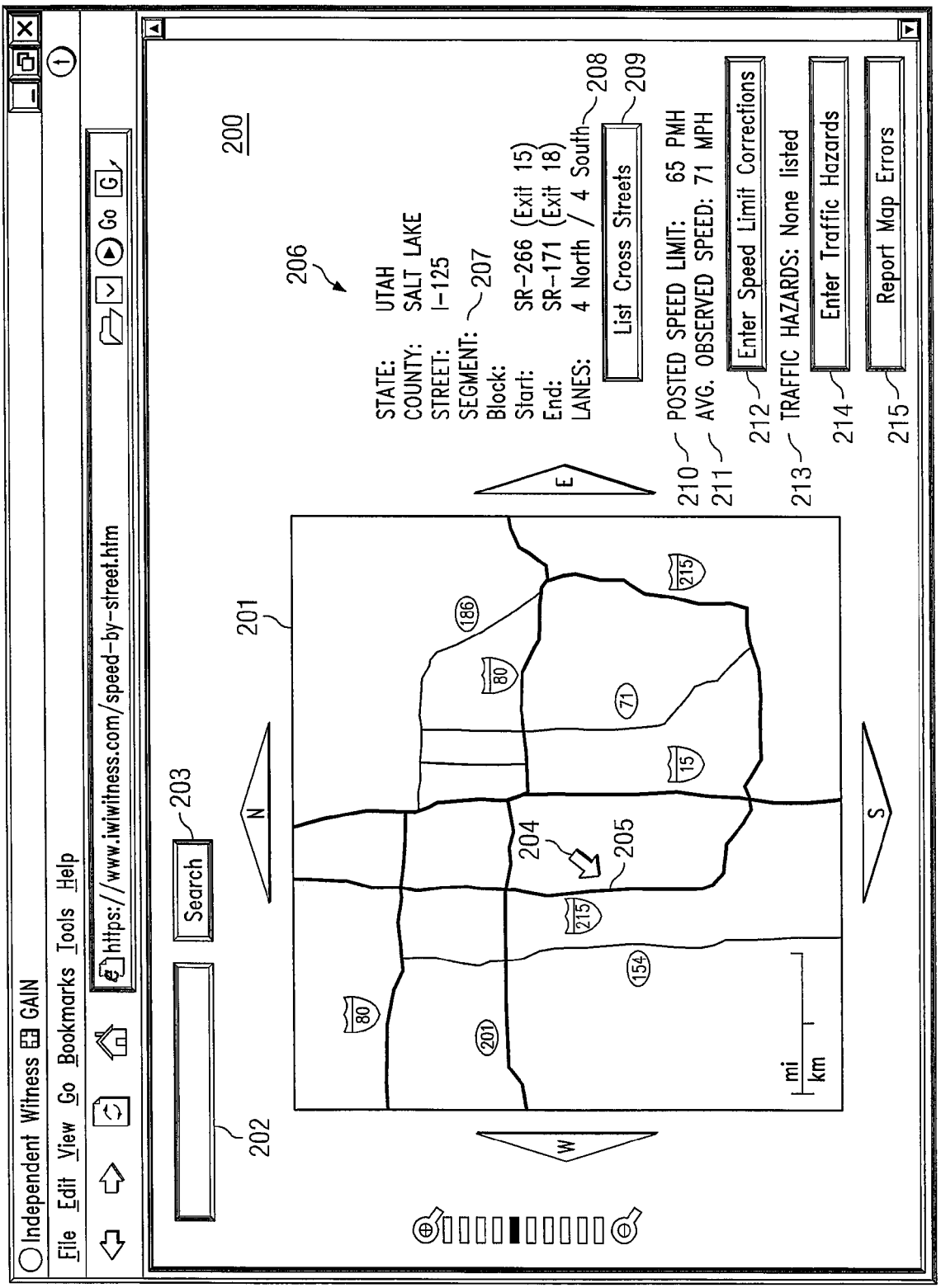
FIG. 2 illustrates an exemplary user interface for use with embodiments of the present invention.

FIG. 2 illustrates an exemplary user interface 200 for use with embodiments of the present invention. Map area 201 displays streets in a selected location. The location may be selected, for example, by entering a street name, city, county, point of interest or other identifier in field 202 and selecting search feature 203. The displayed area on map 201 may be modified such as by zooming in or out or recentering map 201 on other locations. Once a desired area is shown on map 201, a particular street may be selected, such as by "clicking" or "double-clicking" on the road using a mouse or other pointing device 204. In the example illustrated in FIG. 2, street 205 is selected by the user. It will be understood that desired locations or streets may be selected in any other manner, such as, for example, selecting an entry in a drop down list of streets or entering a latitude and longitude of a desired area. It will be further understood that the term "street" as used herein may refer to any throughway, including, without limitation, any interstate, state highway, main thoroughfare, minor thoroughfare, boulevard, street, road, alley, or driveway that can be traversed by a motorized or unmotorized vehicle, animal or person.

Once a particular street 205 is selected, information about that street is shown in display area 206. This information may include the street name and location, such as a state and county, as shown, or a city, geographical coordinates, or other location information. A specific segment 207 of the street may be selected, such as a particular block, group of blocks, a section between two intersections, or a specified distance along the street. In the example illustrated, a section of Interstate 215 near Salt Lake City, Utah is selected. The segment selected using pointer 204 is between state highway 266 and 171. These segments may alternatively be identified using exit designations, such as Exit 15 and Exit 18, or street names, such as 4700 South or 3500 South, or any other identifier. Additional street information, such as the number of lanes 208, direction of traffic, lane width, lane markings, signage, or the like, may be included in the database.

A particular section or segment of the selected road may be identified using List Cross Streets feature 209. For example, by selecting or "clicking" on List Cross Streets 209, the user may be provided with a drop-down list, such as the list of cross-streets illustrated in Table 1.

TABLE 1

| Intersection | Exit |
|---|---|
| UT-186 - Foothill Drive | 1 |
| Interstate 80 | 2 |
| UT-171 - 3300 South | 3 |
| 3900 South | 4 |
| UT-266 - 4500 South | 5 |
| Holladay | 5 |
| 6200 South | 6 |
| UT-152 - 2000 East | 8 |
| Union Park Avenue | 9 |
| 280 East | 10 |
| US-89 - State Street | 11 |
| Interstate 15 | 12 |
| UT-68 - Redwood Road | 13 |
| UT-266 - 4700 South | 15 |
| UT-171 - 3500 South | 18 |
| UT-201 - 21st South/Magna | 20 |
| California Avenue | 21 |
| Interstate 80 | 22 |
| 7th North | 23 |
| 22nd North | 25 |
| UT-68 - Redwood Road | 27 |
| Interstate 15 | 29 |

The user may select a start and an end point on the selected street by clicking on one of the listed intersections or cross streets. The present example uses interstate highway 215 as the selected street. Accordingly, in one embodiment, the listed cross-streets or intersections may be limited to include only those streets that are actual exits from the interstate. In another embodiment, all cross-streets may be listed, including those that are not directly accessible to the selected street, but which only pass over or under the interstate highway. Alternatively, only cross-streets having certain characteristics may be listed, such as streets with a certain number of lanes or streets designated as main thoroughfares. Segments of the selected street may also be designated using street addresses, or the entire street may be selected.

The posted speed limit 210 is also listed for the selected segment. The posted speed limit may be obtained from observing actual speed limit signs or from public databases of street data. If an observer or user has monitored the actual or average speed of vehicles on the selected segment, that speed may be listed as an average observed speed 211. Either of these values—the posted speed limit or the average observed speed—may be used as a monitoring threshold by vehicle monitoring system 101 (FIG. 1) to evaluate and mentor drivers. Other speed limits may be included in display 206, such as posted minimum speeds, and observed speeds at different times of day or days of the week. A user may provide speed limit feedback to the vehicle monitoring system using Enter Speed Limit Corrections feature 212. By selecting feature 212, the user may prompted, for example, to provide the information missing in Table 2.

TABLE 2

| | |
|---|---|
| Street: | I-215 |
| Segment: | SR-266 to SR-171 |
| Posted Speed: | 65 MPH |
| Date of Observation: | |
| Time of Observation: | |
| Observed Posted Speed: | |
| Observed Actual Speed: | |

The user may enter the requested information to the website or user interface. For example, if the database has the wrong posted speed limit, the user can enter the speed limit that was actually posted for this segment of the street. If the posted speed is correct, but drivers typically exceed that speed limit, then the user may enter an observed actual vehicle speed or observed average vehicle speed for this segment. The vehicle monitoring system may be configured to use the observed vehicle speed instead of, or in addition to, the posted speed limit when evaluating the driver's performance or providing mentoring feedback to the driver.

Traffic hazards for the selected street or street segment may be listed at 213 or new or changed road hazards may be entered at 214. Road hazards, such as construction zones, lane closures, rough roads, pot holes, steep grade, blind intersection, dangerous turns, hazardous roads, speed traps, dangerous intersections, curvy roads, slippery when wet, or any other street conditions, may be displayed to, or entered by, the user. New road hazards are entered in 214 using, for example, a drop-down list, text box, checklist or any other method. The street condition or road hazard data may be used by the vehicle monitoring system to evaluate driver performance. For example, if a street has been designated as a construction zone, then the speeding criteria used by the vehicle monitoring system may use a lower speed threshold or parameter than the posted speed limit to evaluate the driver or to provide feedback to the driver. In order to protect construction works in some states, traffic fines are doubled or otherwise enhanced in construction zones. Accordingly, in some embodiments, the vehicle monitoring system may use more restrictive speeding thresholds or monitoring parameters in construction zones to provide increased mentoring to the driver to reduce the risk of getting a ticket in those areas.

When new road hazards are entered, the vehicle monitoring system may allow the new hazard to be displayed to all other users immediately, or the new hazard may be reviewed by an operator or agent before being posted publicly. Alternatively, the system may require a number of users to report a particular road hazard or speed limit correction before the hazard is considered for addition to the database. Requiring multiple users to report a road hazard or speed limit correction may reduce the inclusion of inaccurate, malicious or transient information in the database. All users of the vehicle monitoring system may be allowed to access user-interface or website 200 or the access may be restricted to certain users based on location, experience, vehicle, service type, or other considerations. For example, the system may limit the entry of road hazard data only to those users who regularly drive in the area or street having a potential hazard.

Users may also report map errors using feature 215. This feature would allow users to identify missing or new streets that do not appear on map 201, upgraded streets that have been improved or widened, changed or erroneous street names, or traffic direction restrictions (e.g. one-way street or no left turn at intersection). The map errors entered in 215 may be reviewed by an operator or agent and the actual location of the alleged incorrect information may be observed before entering the information in the database.

It will be understood that the exemplary user interface 200 and the features illustrated in FIG. 2 are just one example of numerous possibilities for creating a webpage or other interface for use with the present invention. The illustrated features may be arranged in any other order and may include additional or less information. The features may alternatively be displayed on separate or multiple web pages.

The present invention is also directed to identifying and compensating for differences in speed limits at intersections and/or when two or more roads are in close proximity. For example, when a vehicle passes through an intersection, it is technically traveling on two streets at the same time and each of those streets may have different posted speed limits and/or different speed limits in the speed-by-street database. If a vehicle is traveling on an interstate highway or major road it will likely pass across, over, or under numerous cross streets that may have speed limits that are different from the speed limit for the road the vehicle is actually traveling on. When the vehicle crosses an intersection with one of these cross streets, the vehicle monitoring system may have two or more choices of speed limit thresholds to use for monitoring and mentoring, such as thresholds or speed limits for the main road and the cross street. If the vehicle monitoring system chooses to use the cross street speed limit data while the vehicle crossing the intersection on a main road, then the driver may be incorrectly warned or reported for speeding if the cross street speed limit is lower than the main road. Similarly, if two roads with different speed limits are in close proximity, such as an interstate highway and a frontage road, then the driver may be incorrectly warned or reported for speeding if the vehicle monitoring system uses the wrong speed limit data. The vehicle's GPS position would typically show the user on the proper road, but errors in the mapping data or the GPS information may present times when the vehicle monitoring system would need to select from two or more speed limits.

An averaging approach may be used in one embodiment of the invention to address the problem of intersecting or close streets. In averaging, when a vehicle is at an intersection, the vehicle monitoring system averages the values of the intersecting streets. For example, if the vehicle is traveling at 50 MPH on a street having a 50 MPH speed limit and crosses a street with a 30 MPH speed limit, then the vehicle monitoring system may momentarily determine that the vehicle has exceeded the speed limit by 20 MPH, which is likely to be considered an excessive speeding condition to be reported by the vehicle monitoring system. The averaging approach minimizes the false excessive speeding warnings by averaging the speed limits of the two streets. In the example above, the speed limit threshold used by the vehicle monitoring system at or near the intersection would be 40 MPH (i.e. the average of 30 MPH and 50 MPH). This may incorrectly cause the vehicle monitoring system to determine that the vehicle is speeding by 10 MPH, but the magnitude of the false speeding violation has been reduced and is less likely to cause immediate speeding reporting against the driver.

In another embodiment, the speed limit averaging may include speed limit values for more than one location, such as a series of locations along a vehicle path. For example, speed limit data for three consecutive locations may be used at, for example, a sampling rate of 30 seconds. Accordingly, when the vehicle is on a 50 MPH street segment having no intersections, the averaged speed limit threshold for three consecutive samples will be 50 MPH (i.e. the average of three 50 MPH samples). However, if the vehicle passes an intersection with a 30 MPH street during one of the samples, then the averaged speed limit threshold will be 45 MPH (i.e. the average of three 50 MPH samples and one overlapping 30 MPH sample). Using this method, the vehicle monitoring system may detect that the vehicle—which is traveling at 50 MPH through the intersection—is speeding by only 5 MPH (i.e. 50 MPH actual speed versus 45 MPH for the averaged speed limit samples). This is less likely to cause a false, incorrect or erroneous speeding report against the driver and, in some embodiments, may not even trigger mentoring feedback to the driver. It will be understood that the sampling rate of the street speed limit may vary and may be faster or slower (e.g. sample every second, 15 seconds, or minute) depending upon user or operator preference. Also, the number of speed limit samples that are averaged may be increased or decreased depending on user or operator preference. By adjusting the sample rate and number of samples, the false speeding violation detections in the vehicle monitoring system may be significantly reduced.

In another embodiment, the sample rate of the vehicle's speed may be increased or decreased at or near intersections to avoid erroneous speeding violation reports. For example, if the sample rate was reduced at or near an intersection, or if the speed thresholds were ignored at intersections, then it would be less likely for the vehicle monitoring system to make a false speeding determination. Because a vehicle is likely to move through the intersection quickly, temporarily ignoring the speeding thresholds in the intersection is unlikely to have a significant effect on the vehicle monitoring system's monitoring and mentoring functions. Moreover, if an actual speeding condition is occurring, then the vehicle monitoring system will detect and report this condition once the vehicle is out of the intersection. In one embodiment, the determination to use or ignore speed limit thresholds at intersections may depend upon the speed limit for the street on which the vehicle is traveling. For example, if the vehicle is traveling on a street with a speed limit of 50 MPH or above, then it is likely that the vehicle will pass intersections with streets having speed limits of 30 MPH or below, which may create a false speeding violation of 20 MPH or more. Accordingly, when traveling on streets with speed limits above 50 MPH or some other speed limit value, the vehicle monitoring system may ignore speeding violations or may not make a speeding determination or analysis at or near intersections.

In a further embodiment of the invention, the vehicle's heading or directional information is used to determine the proper speed limit threshold data that should be used by the vehicle monitoring system. The vehicle monitoring system receives GPS data, which may include heading information for the vehicle. Alternatively, the vehicle monitoring system may calculate the vehicle's heading from two or more reports of the vehicle's location. By comparing the vehicle's heading to the orientation of the streets at an intersection or streets in close proximity, the vehicle monitoring system may eliminate or reduce the use of incorrect speed limit data. If the vehicle is traveling eastbound on a street that intersects a north-south street, then, at or near the intersection, the vehicle monitoring system may determine the vehicle's heading (i.e. east) and select speed limit data for the street that most closely matches the vehicle's heading. Depending on the accuracy of the speed-by-street mapping data and the GPS heading calculation, the vehicle monitoring system may use heading information to eliminate potentially incorrect speed limit thresholds for streets that intersect not only at right angles, but also at more acute angles. The vehicle's most recent heading may be used to select the speed limit threshold to be used. Alternatively, the vehicle's heading over a period of time may be averaged, if desired, and the average used to select the threshold speed limit data. The sampling rate of the vehicle's heading may be increased or decreased, as desired, to improve the accuracy of the speed limit analysis. For example, when a dramatic drop in the speed limit threshold is detected, the vehicle monitoring system may compare the most recent heading and the previous posted speed at that heading. The vehicle monitoring system may then continue to use the previous posted speed and increase the sample rate until the speed limit data stabilizes again.

As noted above, the vehicle monitoring system may have a button, switch or other interface that allows the driver to indicate situations or locations where the speed-by-street data is incorrect. For example, if the driver is traveling at a posted speed limit, but is receiving mentoring feedback for speeding violations from the vehicle monitoring system, then the user may desire to note the location of the false or potentially incorrect speeding violation. By pressing a button on the vehicle monitoring system interface, for example, the driver may designate the false speeding location. Alternatively, the user may be able to call an operator or customer service agent to report errors in the speed-by-street data at a current location. When the user presses the "error location" or "database error" button, a message will be sent from the vehicle monitoring system to the central server or database noting the vehicle's current location, the vehicle's current speed and/or heading, the date and/or time, and any other relevant or helpful information. A service provider may then evaluate the user-reported location for possible updates and/or corrections to the speed-by-street database. The user or driver may report speed limit data that is lower or higher than actual speed limits in this manner. Furthermore, the user may provide additional information, such as an actual posted speed, is the vehicle monitoring system provides an interface for entering such data.

In some embodiments of the invention, drivers or users of the vehicle monitoring system may receive an award or incentive for reporting database errors. For example, the user may receive an award for reporting validated or confirmed errors of particular significance or magnitude or for reporting some number of validated or confirmed errors.

Figure 3:
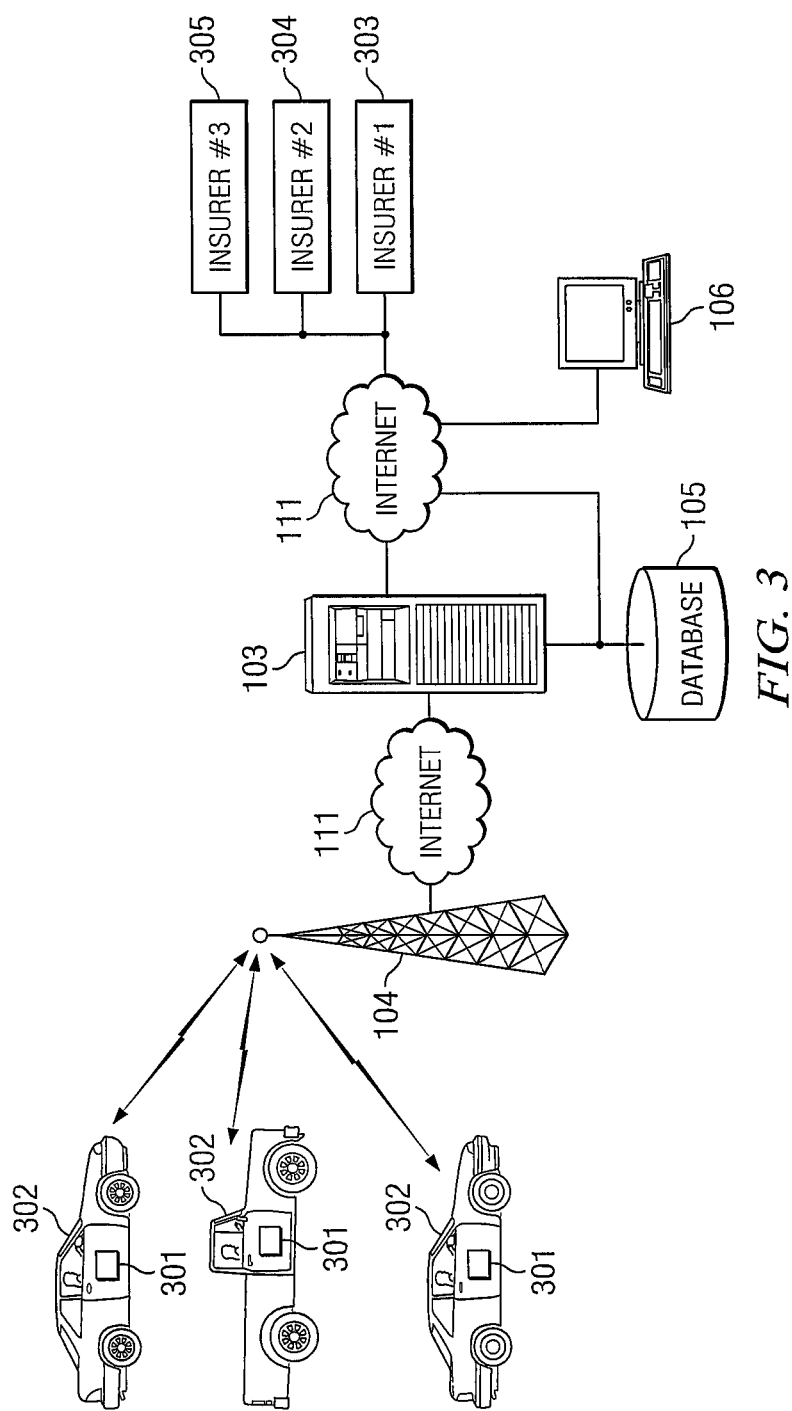
FIG. 3 illustrates another embodiment of a system for implementing the present invention.

Referring to FIG. 3, in another embodiment of the invention, monitoring devices 301 are installed in a plurality of vehicles 302. Users may access their driving performance data and grades stored in database 105 via terminal 106. Additionally, insurance companies or agents 303-305 may also access the data and other driver information directly from database 105 or via central server 103. Insurance companies 303-305 may access the driver data via the Internet or other network connection. Monitoring devices 301 and central server 103 may be operated by one or more insurance companies 303-305 or by another company or service provider outside the insurance industry, such as the manufacturer or retailer of vehicle monitoring systems 301. The monitoring system operator may group the drivers into categories, such as excellent, good, fair or poor, and solicit bids or offers from insurance companies 303-305 to insure the drivers, such as described in U.S. patent application Ser. No. 11/779,176, filed Jul. 17, 2007, entitled "System and Method for Categorizing Driving Behavior Using Driver Mentoring and/or Monitoring Equipment to Determine an Underwriting Risk," the disclosure of which is hereby incorporated by reference herein in its entirety.

The monitoring system operator may post a listing on a website, database, FTP site, electronic bulletin board or other location to notify insurance companies 303-305 that certain groups of drivers are seeking insurance coverage. Insurance companies 303-305 may evaluate the drivers' driving performance grades or categories and determine if they want to bid on offering insurance coverage to these drivers. The insurance companies may offer to insure one or more drivers with a particular category or group. The insurance companies may post or send their bid or other offer for insurance coverage to central server 103 to be passed on to the driver. Alternatively, an insurance company may contact a driver directly to offer coverage.

Figure 4:
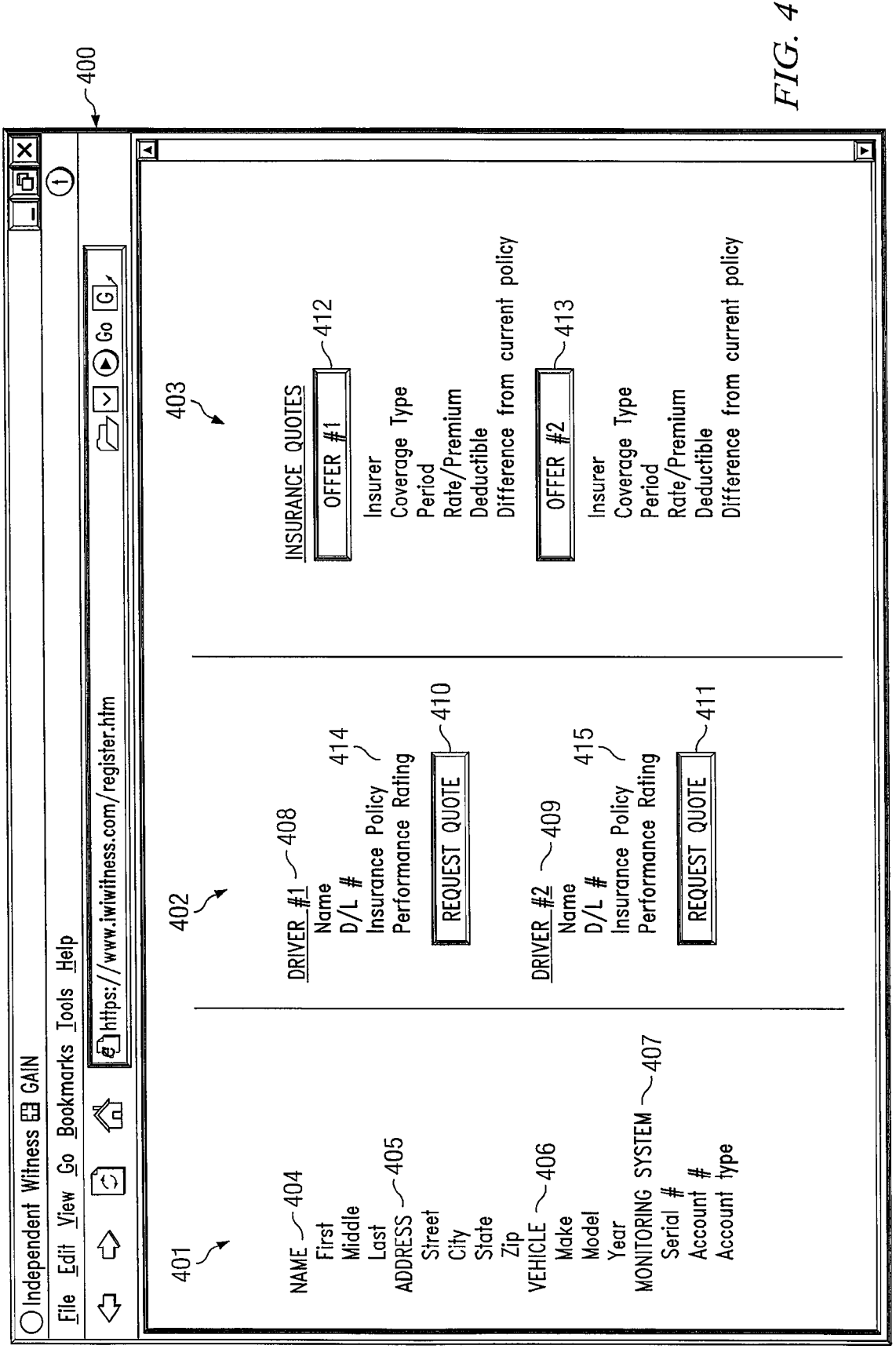
FIG. 4 illustrates an exemplary user interface for use with embodiments of the present invention.

Referring to FIG. 4, in one embodiment of the invention, a web-portal and/or user-interface 400 allows users to register their vehicle and/or vehicle monitoring system hardware. Account information section 401 allows the user to enter or edit user name 404, address 405 and vehicle 406 data. In monitoring system section 407, the user may enter the serial number of the monitoring system installed in his or her vehicle. User interface 400 may also be used to activate the vehicle monitoring system and to set monitoring thresholds and mentoring parameters for the vehicle monitoring system. Additionally, in some embodiments, the user may provide credit card or other financial information to pay for the monitoring service. A system and method for registering drivers is disclosed in U.S. patent application Ser. No. 11/758,444, entitled "System and Method for Automatically Registering a Vehicle Monitoring Device," filed on Jun. 5, 2007, the disclosure of which is hereby incorporated by reference herein in its entirety.

In driver information section 402, data for drivers 408 and 409 is entered or edited. One or more drivers may be associated with a particular vehicle monitoring system and vehicle. The driver data may include the driver's name, drivers license number, and current insurance policy data. Additionally, as the drivers are evaluated by the vehicle monitoring system, they are assigned a performance rating or grade 414, 415. As noted above, this grade may be on an excellent, good, fair, and poor scale or on a letter grade or any other scale. In embodiments of the invention, the user may also request insurance quotes by selecting a request quote feature 410, 411. The insurance quote may be based, for example, on the driver's performance rating and/or on other factors.

In insurance quote section 403, one or more insurance offers may be displayed to the user for consideration. Offers 412 and 413 may provide, for example, the insurer's name, the coverage types offered, the coverage period, the rate or premium for that period, the associated deductible amounts, and any difference compared to the driver's or user's current auto insurance policy. For example, the offer may display a percent or amount of savings or coverage differences compared to an existing policy. In some embodiments, the user may obtain additional information about the offer or accept the offer by selecting offer feature 412 or 413, which may, for example, link the user to an insurance company's website to complete the registration process.

It will be understood that account information section 401, driver information section 402, and insurance quote section 403 may be arranged in any other order and may alternatively be displayed on separate webpages. Moreover, the account, driver and insurance data displayed or requested may include any or all of the features shown in FIG. 4 and/or any additional data.

Once a user has registered with the vehicle monitoring system service provider, the service collects driver performance data from the vehicle that is equipped with the vehicle/driver monitoring system. The driver information may be stored to the service provider's site and may be viewed by insurance companies as well as being displayed to the user. In one embodiment, the insurance companies may bid on individual drivers or groups of drivers the companies want to insure. For example, an insurance company may consider an individual or group of drivers that have the same driving rating for insurance coverage. By breaking the drivers down into driver performance rating categories, the insurers may be able to offer lower insurance rates to excellent drivers who have the same vehicle and personal profiles as poor drivers.

In an embodiment of the invention, the service provider may hold the raw driving performance data and the insurance companies may subscribe to or otherwise access that data to determine which drivers they want to insure and at what price. The insurance companies may also use the vehicle monitoring system to obtain driver performance data for current customers in addition to potential customers. Current customer insurance rates may be dependent upon the driver's current driving performance evaluation or grade.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In an on-board vehicle monitoring system that monitors and reports real-time speeding violations to a driver of a vehicle to facilitate corrective behavior by the driver while operating the vehicle, a method of permitting the driver to identify perceived errors in speeding violations that are reported by the monitoring system, the method comprising:

storing in a database geographic map data that includes identifying data for a plurality of streets, including speed data for streets included in the map data;

detecting at one or more sensors installed in a vehicle parameters from which data is derived that defines
  i) GPS data as to where the vehicle is being driven,
  ii) date and time data as to when the vehicle is being driven, and
  iii) speed data that identifies the speed at which the vehicle is being driven;

inputting the detected parameters to an on-board vehicle monitoring system which comprises system memory and one or more processors for data processing, the on-board vehicle monitoring system evaluating the input detected parameters by performing the following computer-implemented data processing:
  i) determining from GPS data a particular street contained in the geographic map data where the vehicle is traveling, and
  ii) determining from the speed data which identifies the speed at which the vehicle is being driven, and from the speed data for the particular street where the vehicle is traveling, when the vehicle speed exceeds the street speed by more than a threshold amount;

iii) when the vehicle speed exceeds the street speed by more than said threshold amount, storing the date, time, street location and speed data in the system memory and correlating the stored information to the vehicle driver, and providing a discernible warning to the driver of a speeding violation;

at the on-board vehicle monitoring system, in response to a warning provided by the on-board vehicle monitoring system, observing by the driver that the warning is inconsistent with actual driving conditions and then activating in response to a single driver input a real-time error indication that a speeding violation warning issued by the vehicle monitoring system to the driver of the vehicle is an error based on the vehicle driver's observation of the actual posted speed or the actual traffic speed for the particular street on which the vehicle is traveling; and so that the most current parameters are used to evaluate drivers, in response to said activation by the driver of said error indication, the vehicle monitoring system performing the following:

storing in system memory the data for the error indication, including identification of the driver, a particular street location, the date and time the vehicle was traveling on the particular street, and the vehicle speed; and sending to a central server or database said data for the error indication in order to enable evaluation of the driver using the most current parameters.

2. The method of claim 1, wherein the speed data for a street included in the geographic map data of the database is corrected in response to at least one instance of error data stored in system memory of the vehicle monitoring system.

3. The method of claim 2, wherein the error data is transmitted from the vehicle monitoring system for use in correcting the database either in real time or at intervals.

4. The method of claim 1, wherein the speed data for a street included in the geographic map data of the database is corrected in response to a plurality of instances of error data stored in system memory of a plurality of vehicle monitoring systems.

5. The method of claim 4, wherein the correction of the geographic map data of the database is triggered only after the plurality of instances of error data for a given street location reaches a threshold number.

6. The method of claim 4, wherein the plurality of instances of error data is transmitted from the vehicle monitoring system for use in correcting the database either in real time or at intervals.

7. The method of claim 1, wherein the vehicle monitoring system is used to record one or more types of other errors for use in correcting the database, the one or more types of other errors including at least one of the following: posted speed limits, actual vehicle speed conditions, road hazards, construction zones, lane closures, rough roads, pot holes, steep grade, blind intersection, dangerous turns, speed traps, dangerous intersections, dangerous or winding streets, missing streets, new streets, slippery when wet streets, upgraded streets, erroneous street names, and traffic direction restrictions.

8. The method of claim 7, wherein the one or more types of other errors are provided for use in correcting the database by accessing the database with a user interface provided at a website or web portal which connects to the database through a network.

9. The method of claim 1, wherein detecting said parameters at the one or more sensors further includes detecting parameters from which data is used to calculate the heading of the vehicle, and wherein the method is further comprised of comparing the vehicle's heading to the orientation of streets at an intersection or streets in close proximity to the vehicle and then selecting speed limit data for the street that most closely matches the vehicle's heading, and then comparing the actual vehicle speed to the selected speed limit data for said street that most closely matches the vehicle's heading.

10. The method of claim 1, wherein determining when the vehicle speed exceeds the street speed by more than a threshold amount is determined by averaging speed data for the particular street where the vehicle is traveling along a number of locations as the vehicle approaches a particular location on the street where the vehicle is traveling.

11. The method of claim 1, wherein determining when the vehicle speed exceeds the street speed by more than a threshold amount is determined by averaging speed data for a plurality of streets in the database located near a specific location on the particular street on which the vehicle is traveling.

12. A system for correcting errors in speeding violations reported when using an on-board vehicle monitoring system to monitor and report real-time speeding violations to a driver of a vehicle to facilitate corrective behavior by the driver while operating the vehicle, the system comprising:

data storage which contains a database for geographic map data that includes identifying data for a plurality of streets, and speed data for streets included in the map data;

one or more sensors installed in a vehicle, the sensors detecting parameters from which data is derived that defines
i) GPS data as to where the vehicle is being driven,
ii) date and time data as to when the vehicle is being driven, and
iii) speed data that identifies the speed at which the vehicle is being driven;

an on-board vehicle monitoring system installed in the vehicle, comprising system memory and one or more processors for data processing, the on-board vehicle monitoring system receiving as inputs the detected parameters sensed by said sensors, and the on-board monitoring system then processing the input parameters by performing the following computer-implemented data processing:
i) determining from GPS data a particular street contained in the geographic map data where the vehicle is traveling, and
ii) determining from the speed data which identifies the speed at which the vehicle is being driven, and from the speed data for the particular street where the vehicle is traveling, when the vehicle speed exceeds the street speed by more than a threshold amount;
iii) when the vehicle speed exceeds the street speed by more than a threshold amount, storing the date, time, street location and speed data in the system memory and correlating the stored information to the vehicle driver, and providing a discernible warning to the driver of a speeding violation;

at the on-board vehicle monitoring system, in response to a warning provided by the on-board vehicle monitoring system, observing by the driver that the warning is inconsistent with actual driving conditions and then activating in response to a single driver input a real-time error indication that a speeding violation warning issued by the vehicle monitoring system to the driver of the vehicle is an error based on the vehicle driver's observation of the actual posted speed or the actual traffic speed for the particular street on which the vehicle is traveling; and so that the most current parameters are used to evaluate drivers, in response to said activation by the driver of said error indication, the vehicle monitoring system performing the following:

storing in system memory the data for the error indication, including identification of the driver, a particular street location, the date and time the vehicle was traveling on the particular street, and the vehicle speed; and sending to a central server or database said data for the error indication in order to enable evaluation of the driver using the most current parameters.

13. The system of claim 12, wherein the speed data for a street included in the geographic map data of the database is corrected in response to at least one instance of error data stored in system memory of the vehicle monitoring system.

14. The system of claim 13, wherein the error data is transmitted from the vehicle monitoring system for use in correcting the database either in real time or at intervals.

15. The system of claim 12, wherein the speed data for a street included in the geographic map data of the database is corrected in response to a plurality of instances of error data stored in system memory of a plurality of vehicle monitoring systems.

16. The system of claim 15, wherein the correction of the geographic map data of the database is triggered only after the plurality of instances of error data for a given street location reaches a threshold number.

17. The system of claim 15, wherein the plurality of instances of error data is transmitted from the vehicle monitoring system for use in correcting the database either in real time or at intervals.

18. The system of claim 12, wherein the vehicle monitoring system is used to record one or more types of other errors for use in correcting the database, the one or more types of other errors including at least one of the following: posted speed limits, actual vehicle speed conditions, road hazards, construction zones, lane closures, rough roads, pot holes, steep grade, blind intersection, dangerous turns, speed traps, dangerous intersections, dangerous or winding streets, missing streets, new streets, slippery when wet streets, upgraded streets, erroneous street names, and traffic direction restrictions.

19. The system of claim 18, wherein the one or more types of other errors are provided for use in correcting the database by accessing the database with a user interface provided at a website or web portal which connects to the database through a network.

20. The system of claim 12, wherein detecting said parameters at the one or more sensors further includes detecting parameters from which data is used to calculate the heading of the vehicle, and wherein the method is further comprised of comparing the vehicle's heading to the orientation of streets at an intersection or streets in close proximity to the vehicle and then selecting speed limit data for the street that most closely matches the vehicle's heading, and then comparing the actual vehicle speed to the selected speed limit data for said street that most closely matches the vehicle's heading.

21. The system of claim 12, wherein determining when the vehicle speed exceeds the street speed by more than a threshold amount is determined by averaging speed data for the particular street where the vehicle is traveling along a number of locations as the vehicle approaches a particular location on the street where the vehicle is traveling.

22. The system of claim 12, wherein determining when the vehicle speed exceeds the street speed by more than a threshold amount is determined by averaging speed data for a plurality of streets in the database located near a specific location on the particular street on which the vehicle is traveling.

23. A hardware storage device containing computer-executable instructions which, when executed by one or more processors of an on-board vehicle monitoring system, implement a computerized method for correcting errors in speeding violations reported while using an on-board vehicle monitoring system to monitor and report real-time speeding violations to a driver of a vehicle to facilitate corrective behavior by the driver while operating the vehicle, the computerized method comprising:

receiving inputs at an on-board vehicle monitoring system which comprises system memory and one or more processors for data processing, the received inputs comprising detected parameters sensed at one or more sensors installed in the vehicle, and from which data is derived that defines
  i) GPS data as to where the vehicle is being driven,
  ii) date and time data as to when the vehicle is being driven, and
  iii) speed data that identifies the speed at which the vehicle is being driven;

downloading to the system memory of the on-board vehicle monitoring system geographic map data that includes identifying data for a plurality of streets, including speed data for streets included in the map data;

evaluating at the on-board vehicle monitoring system the input parameters by performing the following computer-implemented data processing:
  i) determining from GPS data a particular street contained in the geographic map data where the vehicle is traveling, and
  ii) determining from the speed data which identifies the speed at which the vehicle is being driven, and from the speed data for the particular street where the vehicle is traveling, when the vehicle speed exceeds the street speed by more than a threshold amount;
  iii) when the vehicle speed exceeds the street speed by more than a threshold amount, storing the date, time, street location and speed data in the system memory and correlating the stored information to the vehicle driver, and providing a discernible warning to the driver of a speeding violation;

at the on-board vehicle monitoring system, in response to a warning provided by the on-board vehicle monitoring system, observing by the driver that the warning is inconsistent with actual driving conditions and then activating in response to a single driver input a real-time error indication that a speeding violation warning issued by the vehicle monitoring system to the driver of the vehicle is an error based on the vehicle driver's observation of the actual posted speed or the actual traffic speed for the particular street on which the vehicle is traveling; and so that the most current parameters are used to evaluate drivers, in response to said activation by the driver of said error indication, the vehicle monitoring system performing the following:

storing in system memory the data for the error indication, including identification of the driver, a particular street location, the date and time the vehicle was traveling on the particular street, and the vehicle speed; and sending to a central server or database said data for the error indication in order to enable evaluation of the driver using the most current parameters.

24. The hardware storage device in which the one or more processors implement the computerized method of claim 23, wherein the speed data for a street included in the geographic map data of the database is corrected in response to at least one instance of error data stored in system memory of the vehicle monitoring system.

25. The hardware storage device in which the one or more processors implement the computerized method of claim 24, wherein the error data is transmitted from the vehicle monitoring system for use in correcting the database either in real time or at intervals.

26. The hardware storage device in which the one or more processors implement the computerized method of claim 23, wherein the speed data for a street included in the geographic map data of the database is corrected in response to a plurality of instances of error data stored in system memory of a plurality of vehicle monitoring systems.

27. The hardware storage device in which the one or more processors implement the computerized method of claim 26, wherein the correction of the geographic map data of the database is triggered only after the plurality of instances of error data for a given street location reaches a threshold number.

28. The hardware storage device in which the one or more processors implement the computerized method of claim 26, wherein the plurality of instances of error data is transmitted from the vehicle monitoring system for use in correcting the database either in real time or at intervals.

29. The hardware storage device in which the one or more processors implement the computerized method of claim 23, wherein the vehicle monitoring system is used to record one or more types of other errors for use in correcting the database, the one or more types of other errors including at least one of the following: posted speed limits, actual vehicle speed conditions, road hazards, construction zones, lane closures, rough roads, pot holes, steep grade, blind intersection, dangerous turns, speed traps, dangerous intersections, dangerous or winding streets, missing streets, new streets, slippery when wet streets, upgraded streets, erroneous street names, and traffic direction restrictions.

30. The hardware storage device in which the one or more processors implement the computerized method of claim 29, wherein the one or more types of other errors are provided for use in correcting the database by accessing the database with a user interface provided at a website or web portal which connects to the database through a network.

31. The hardware storage device in which the one or more processors implement the computerized method of claim 23, wherein detecting said parameters at the one or more sensors further includes detecting parameters from which data is used to calculate the heading of the vehicle, and wherein the method is further comprised of comparing the vehicle's heading to the orientation of streets at an intersection or streets in close proximity to the vehicle and then selecting speed limit data for the street that most closely matches the vehicle's heading, and then comparing the actual vehicle speed to the selected speed limit data for said street that most closely matches the vehicle's heading.

32. The hardware storage device in which the one or more processors implement the computerized method of claim 23, wherein determining when the vehicle speed exceeds the street speed by more than a threshold amount is determined by averaging speed data for the particular street where the vehicle is traveling along a number of locations as the vehicle approaches a particular location on the street where the vehicle is traveling.

33. The hardware storage device in which the one or more processors implement the computerized method of claim 23, wherein determining when the vehicle speed exceeds the street speed by more than a threshold amount is determined by averaging speed data for a plurality of streets in the database located near a specific location on the particular street on which the vehicle is traveling.

* * * * *